(12) United States Patent
Furner et al.

(10) Patent No.: US 12,102,078 B2
(45) Date of Patent: *Oct. 1, 2024

(54) INSECT TRAP DEVICE

(71) Applicant: S. C. Johnson & Son, Inc., Racine, WI (US)

(72) Inventors: Paul E. Furner, Racine, WI (US); Julie Palm, Racine, WI (US); Kamran Faterioun, New Berlin, WI (US); David R. Carlson, Cedarburg, WI (US); Noah I. Tracy, Franksville, WI (US); Murthy S. Munagavalasa, Racine, WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 36 days.

This patent is subject to a terminal disclaimer.

(21) Appl. No.: 17/944,450

(22) Filed: Sep. 14, 2022

(65) Prior Publication Data
US 2023/0011927 A1   Jan. 12, 2023

Related U.S. Application Data

(63) Continuation of application No. 16/653,430, filed on Oct. 15, 2019, now Pat. No. 11,484,022.

(51) Int. Cl.
*A01M 1/04* (2006.01)
*A01M 1/14* (2006.01)
*A01M 1/16* (2006.01)

(52) U.S. Cl.
CPC .............. *A01M 1/145* (2013.01); *A01M 1/04* (2013.01); *A01M 1/14* (2013.01); *A01M 1/165* (2013.01)

(58) Field of Classification Search
CPC .......... A01M 1/04; A01M 1/106; A01M 1/14; A01M 1/145
(Continued)

(56) References Cited

U.S. PATENT DOCUMENTS

| 651,211 A | 6/1900 | Smith |
| 3,023,539 A | 3/1962 | Emerson, Jr. |

(Continued)

FOREIGN PATENT DOCUMENTS

| CA | 2533004 C | 9/2013 |
| CA | 2690419 C | 3/2017 |

(Continued)

OTHER PUBLICATIONS

Fly Web Trap, FlyWeb Wall Outlet UV Light <URL: http://www.firstchoiceokc.com/flyweb-wall-outlet-light-fly-insect-trap.html> (Retrieved online: Jan. 28, 21) Published/Accessed: Aug. 30, 2003 (3 pages).

(Continued)

*Primary Examiner* — David J Parsley
(74) *Attorney, Agent, or Firm* — Quarles & Brady LLP

(57) ABSTRACT

A removable substrate for an insect attractant device includes a body having front and rear faces, a grip portion, and a base disposed opposite the grip portion. The removable substrate further includes a first lateral portion extending from the base, and a second lateral portion extending from the base. A projection extends outwardly from the base, lowermost ends of the first and second lateral portions are disposed below the projection, and an adhesive is applied to the front face and the rear face.

27 Claims, 13 Drawing Sheets

(58) Field of Classification Search
USPC .............. 43/113–115, 124, 132.1; 362/641, 362/643–644
See application file for complete search history.

(56) References Cited

U.S. PATENT DOCUMENTS

| | | | |
|---|---|---|---|
| 4,117,624 A | 10/1978 | Phillips | |
| 4,127,961 A | 12/1978 | Phillips | |
| 4,212,129 A * | 7/1980 | Shumate | A01M 1/04 43/113 |
| 4,566,220 A | 1/1986 | Justice | |
| 4,654,998 A | 4/1987 | Clay | |
| 4,817,868 A | 4/1989 | Cook et al. | |
| 5,044,112 A | 9/1991 | Williams | |
| 5,142,815 A | 9/1992 | Birdsong | |
| 5,259,153 A | 11/1993 | Olive et al. | |
| 5,365,690 A | 11/1994 | Nelson et al. | |
| 5,425,197 A | 6/1995 | Smith | |
| 5,513,465 A | 5/1996 | Demarest et al. | |
| 5,608,987 A | 3/1997 | Meyer | |
| 5,651,211 A | 7/1997 | Regan et al. | |
| 5,722,199 A | 3/1998 | Demarest et al. | |
| 5,915,948 A | 6/1999 | Kunze et al. | |
| 5,950,355 A | 9/1999 | Gilbert | |
| 5,974,727 A | 11/1999 | Gilbert | |
| 6,104,867 A | 8/2000 | Stathakis et al. | |
| 6,108,965 A | 8/2000 | Burrows et al. | |
| 6,250,773 B1 | 6/2001 | Lai | |
| 6,312,671 B1 | 11/2001 | Jensen et al. | |
| 6,322,774 B1 | 11/2001 | Jensen et al. | |
| 6,393,759 B1 | 5/2002 | Brown et al. | |
| 6,397,515 B1 | 6/2002 | Brown et al. | |
| 6,438,894 B1 | 8/2002 | Silvandersson et al. | |
| 6,478,440 B1 | 11/2002 | Jaworski et al. | |
| 6,493,986 B1 | 12/2002 | Nelson et al. | |
| 6,516,558 B1 | 2/2003 | Lingren et al. | |
| 6,560,918 B2 | 5/2003 | Nelson | |
| 6,560,919 B2 | 5/2003 | Burrows et al. | |
| 6,574,914 B2 | 6/2003 | Smith | |
| 6,590,919 B1 | 7/2003 | Jeta | |
| 6,610,254 B1 | 8/2003 | Furner et al. | |
| 6,618,983 B1 | 9/2003 | Spragins | |
| 6,625,922 B1 | 9/2003 | Emsberger, IV | |
| 6,661,967 B2 | 12/2003 | Levine et al. | |
| 6,718,687 B2 | 4/2004 | Robison | |
| 6,728,478 B2 | 4/2004 | Cox | |
| 6,758,009 B1 | 7/2004 | Warner | |
| 6,768,865 B2 | 7/2004 | Stathakis et al. | |
| 6,792,199 B2 | 9/2004 | Levine et al. | |
| 6,859,615 B2 | 2/2005 | Yip | |
| 6,862,839 B2 | 3/2005 | Watanabe | |
| 6,871,443 B2 | 3/2005 | Lambert et al. | |
| 6,886,292 B2 | 5/2005 | Studer et al. | |
| 6,917,754 B2 | 7/2005 | Pedrotti et al. | |
| 6,996,335 B2 | 2/2006 | Zobele | |
| 7,036,268 B2 | 5/2006 | Taylor et al. | |
| 7,096,621 B2 | 8/2006 | Nelson et al. | |
| 7,138,130 B2 | 11/2006 | Davis et al. | |
| 7,143,542 B2 | 12/2006 | Taylor et al. | |
| 7,186,016 B2 | 3/2007 | Jao | |
| 7,191,560 B2 | 3/2007 | Harris | |
| 7,204,870 B2 | 4/2007 | Zobele et al. | |
| 7,281,350 B2 | 10/2007 | Wilbanks | |
| 7,313,321 B2 | 12/2007 | He et al. | |
| 7,383,660 B2 | 6/2008 | Greening | |
| 7,523,577 B2 | 4/2009 | Majerowski | |
| 7,542,664 B2 | 6/2009 | He et al. | |
| 7,553,062 B2 | 6/2009 | Spartano et al. | |
| 7,591,099 B2 | 9/2009 | Lang et al. | |
| 7,622,134 B2 | 11/2009 | Davis et al. | |
| 7,625,578 B2 | 12/2009 | Davis et al. | |
| 7,629,001 B2 | 12/2009 | Davis et al. | |
| 7,665,238 B2 | 2/2010 | Majerowski | |
| 7,674,615 B2 | 3/2010 | Ramel et al. | |
| 7,784,215 B2 | 8/2010 | Cohnstaedt et al. | |
| 7,841,131 B2 | 11/2010 | Nelson | |
| 7,856,752 B1 | 12/2010 | Eilersen | |
| 7,932,482 B2 | 4/2011 | Norwood et al. | |
| 8,104,223 B1 | 1/2012 | Rodriguez | |
| 8,240,081 B2 | 8/2012 | Cuellar Bernal | |
| 8,266,839 B2 | 9/2012 | Bernard | |
| 8,291,638 B2 | 10/2012 | Larsen | |
| 8,316,578 B2 | 11/2012 | Faham et al. | |
| 8,341,873 B2 | 1/2013 | Frisch | |
| 8,341,874 B2 | 1/2013 | Studer et al. | |
| 8,371,064 B2 | 2/2013 | Watson | |
| 8,375,625 B2 | 2/2013 | Larsen | |
| 8,402,691 B2 | 3/2013 | Coventry | |
| 8,572,890 B1 | 11/2013 | Lark et al. | |
| 8,574,919 B2 | 11/2013 | Ramel et al. | |
| 8,673,223 B1 | 3/2014 | Finlay | |
| 8,677,677 B2 | 3/2014 | Schneidmiller et al. | |
| 8,701,335 B2 | 4/2014 | Larsen | |
| 8,707,614 B2 | 4/2014 | Larsen | |
| 8,718,454 B2 | 5/2014 | Caserta et al. | |
| 8,739,461 B2 | 6/2014 | Studer et al. | |
| 8,793,927 B2 | 8/2014 | Winkler | |
| 8,793,928 B2 | 8/2014 | Larsen | |
| 8,800,198 B2 | 8/2014 | Frisch | |
| 8,808,721 B2 | 8/2014 | Banfield et al. | |
| 8,813,419 B2 | 8/2014 | Schneidmiller et al. | |
| 8,879,898 B2 | 11/2014 | Neumann | |
| 8,893,428 B2 | 11/2014 | Dykstra | |
| 8,904,701 B2 | 12/2014 | Vasudeva et al. | |
| 8,925,905 B2 | 1/2015 | Vieira | |
| 8,959,831 B2 | 2/2015 | Smith | |
| 8,978,290 B2 | 3/2015 | Wright | |
| 8,984,804 B2 | 3/2015 | Borth et al. | |
| 9,015,988 B2 | 4/2015 | Zhang et al. | |
| 9,060,503 B2 | 6/2015 | Gilbert, II | |
| 9,066,508 B2 | 6/2015 | Aroniss | |
| 9,113,622 B2 | 8/2015 | Lawrence et al. | |
| 9,173,388 B2 | 11/2015 | Canfield et al. | |
| 9,226,488 B2 | 1/2016 | Schumacher | |
| 9,386,763 B2 | 7/2016 | Vasudeva | |
| 9,393,333 B2 | 7/2016 | Barlow et al. | |
| 9,480,247 B2 | 11/2016 | Beitler | |
| 9,526,237 B2 | 12/2016 | Zhang et al. | |
| 9,585,376 B2 | 3/2017 | Park et al. | |
| 9,675,059 B2 | 6/2017 | Waldman et al. | |
| 9,737,065 B1 | 8/2017 | Hottel et al. | |
| 9,775,334 B2 | 10/2017 | Dykstra | |
| 9,833,530 B2 | 12/2017 | Gordon et al. | |
| 9,861,090 B2 | 1/2018 | Heath et al. | |
| 9,883,666 B1 | 2/2018 | Conklin | |
| 9,949,472 B2 | 4/2018 | Willcox et al. | |
| 9,993,574 B2 | 6/2018 | Gruenbacher et al. | |
| 10,010,639 B2 | 7/2018 | Wilson et al. | |
| 10,021,869 B1 | 7/2018 | Cogley | |
| 10,021,871 B1 | 7/2018 | Cogley | |
| 10,091,980 B1 | 10/2018 | Cogley | |
| 10,091,981 B1 | 10/2018 | Cogley | |
| 10,136,631 B2 | 11/2018 | Thuis et al. | |
| 10,143,191 B2 | 12/2018 | Studer et al. | |
| 10,314,299 B2 | 6/2019 | Ikawa | |
| 10,729,374 B1 | 8/2020 | Cogley | |
| 10,973,217 B2 | 4/2021 | Studer et al. | |
| 11,109,583 B2 | 4/2021 | Parnell et al. | |
| 11,102,972 B2 | 8/2021 | Llorente et al. | |
| 11,311,005 B2 | 4/2022 | Smith | |
| D953,475 S | 5/2022 | Rocha | |
| 2001/0042337 A1 | 11/2001 | Lambert et al. | |
| 2002/0078620 A1 | 6/2002 | Nelson et al. | |
| 2004/0016173 A1 | 1/2004 | Tully et al. | |
| 2006/0107583 A1 | 5/2006 | Wu | |
| 2006/0283075 A1 | 12/2006 | Feldhege et al. | |
| 2007/0068066 A1 | 3/2007 | Reatti | |
| 2007/0237498 A1 | 10/2007 | Helf | |
| 2008/0229652 A1 | 9/2008 | Willcox et al. | |
| 2009/0288333 A1 | 11/2009 | Johnston et al. | |
| 2010/0024278 A1 | 2/2010 | Simchoni-Barak et al. | |
| 2012/0186136 A1 | 7/2012 | Schneidmiller | |
| 2012/0324779 A1 | 12/2012 | Kovacs et al. | |
| 2013/0312314 A1 | 11/2013 | Greening et al. | |

(56) References Cited

U.S. PATENT DOCUMENTS

| | | |
|---|---|---|
| 2015/0020438 A1 | 1/2015 | Work |
| 2015/0047250 A1 | 2/2015 | Parks et al. |
| 2015/0083193 A1 | 3/2015 | Jeda |
| 2015/0150233 A1 | 6/2015 | Dykstra |
| 2015/0164060 A1 | 6/2015 | Pankowski |
| 2016/0000060 A1 | 1/2016 | Sandford |
| 2016/0066555 A1 | 3/2016 | Yans |
| 2016/0106088 A1 | 4/2016 | Lawrence et al. |
| 2016/0120164 A1 | 5/2016 | Li |
| 2016/0262367 A1 | 9/2016 | Sandford et al. |
| 2016/0278361 A1 | 9/2016 | Work |
| 2016/0286782 A1 | 9/2016 | Manhas et al. |
| 2016/0309697 A1 | 10/2016 | Roma |
| 2016/0345569 A1 | 12/2016 | Freudenberg et al. |
| 2017/0000101 A1 | 1/2017 | Gaugler et al. |
| 2017/0006847 A1 | 1/2017 | McGowan et al. |
| 2017/0006849 A1 | 1/2017 | Frutos et al. |
| 2017/0013821 A1 | 1/2017 | Brown |
| 2017/0035039 A1 | 2/2017 | Sandford et al. |
| 2017/0112116 A1 | 4/2017 | Ji et al. |
| 2017/0156303 A1 | 6/2017 | Cooper |
| 2017/0290322 A1 | 10/2017 | Soeno |
| 2017/0295772 A1 | 10/2017 | Studer et al. |
| 2017/0303523 A1 | 10/2017 | Sandford |
| 2017/0319731 A1 | 11/2017 | Hasenoehrl et al. |
| 2018/0027794 A1 | 2/2018 | Hortel et al. |
| 2018/0035657 A1 | 2/2018 | Ots et al. |
| 2018/0054981 A1 | 3/2018 | Work |
| 2018/0116198 A1 | 5/2018 | Manhas et al. |
| 2018/0235202 A1 | 8/2018 | Sandford et al. |
| 2019/0045771 A1 | 2/2019 | Rocha et al. |
| 2019/0090470 A1 | 3/2019 | Lee et al. |
| 2019/0116777 A1 | 4/2019 | Akiba |
| 2019/0141979 A1 | 5/2019 | Smith |
| 2019/0239501 A1 | 8/2019 | Manhas |
| 2019/0350184 A1 | 11/2019 | Chang et al. |
| 2019/0357516 A1 | 11/2019 | Chang |
| 2020/0037595 A1 | 2/2020 | Cook |
| 2020/0113164 A1 | 4/2020 | Zamboni |
| 2020/0245606 A1 | 8/2020 | Rocha et al. |
| 2020/0375169 A1 | 12/2020 | Zheng |
| 2021/0105991 A1 | 4/2021 | Furner |
| 2021/0368763 A1 | 12/2021 | Fish |
| 2022/0039366 A1 | 2/2022 | Parnell et al. |

FOREIGN PATENT DOCUMENTS

| | | |
|---|---|---|
| CA | 2824850 C | 6/2018 |
| CN | 1154791 A | 7/1997 |
| CN | 2274416 Y | 2/1998 |
| CN | 2359895 Y | 1/2000 |
| CN | 1111351 C | 6/2003 |
| CN | 2834186 Y | 11/2006 |
| CN | 201234518 Y | 5/2009 |
| CN | 201451115 U | 5/2010 |
| CN | 209862049 U | 12/2019 |
| CN | 110050772 A | 8/2020 |
| CN | 111528202 A | 8/2020 |
| CN | 211298157 U | 8/2020 |
| DE | 8802934 U1 | 5/1988 |
| DE | 10236531 A1 | 2/2004 |
| DE | 10356564 A1 | 7/2005 |
| EP | 1213958 B1 | 11/2003 |
| EP | 0947134 B1 | 9/2004 |
| EP | 1457111 B1 | 10/2006 |
| EP | 1586335 B1 | 5/2007 |
| EP | 2007443 B1 | 2/2010 |
| EP | 1619943 B1 | 6/2010 |
| EP | 2210488 A2 | 7/2010 |
| EP | 1076014 B2 | 10/2010 |
| EP | 2296460 A2 | 3/2011 |
| EP | 2100503 B1 | 6/2012 |
| EP | 2467017 B1 | 5/2013 |
| EP | 2627170 A1 | 8/2013 |
| EP | 2149301 B1 | 11/2013 |
| EP | 2667707 A2 | 12/2013 |
| EP | 2721928 A1 | 4/2014 |
| EP | 2296460 A4 | 7/2014 |
| EP | 2854525 A1 | 4/2015 |
| EP | 2939537 A1 | 11/2015 |
| EP | 2941956 A1 | 11/2015 |
| EP | 2943061 A1 | 11/2015 |
| EP | 2961267 A1 | 1/2016 |
| EP | 2962558 A1 | 1/2016 |
| EP | 2863737 B1 | 3/2016 |
| EP | 1919278 B1 | 4/2016 |
| EP | 2670236 B1 | 4/2016 |
| EP | 2319302 B1 | 7/2016 |
| EP | 3073822 A1 | 10/2016 |
| EP | 3082432 A1 | 10/2016 |
| EP | 3092895 A1 | 11/2016 |
| EP | 3145309 A1 | 3/2017 |
| EP | 2854524 B1 | 5/2017 |
| EP | 3162202 A1 | 5/2017 |
| EP | 3162204 A1 | 5/2017 |
| EP | 3192367 A1 | 7/2017 |
| EP | 3269236 A1 | 1/2018 |
| EP | 3270689 A1 | 1/2018 |
| EP | 3313177 A1 | 5/2018 |
| EP | 1776574 B1 | 11/2018 |
| GB | 2180135 A | 3/1987 |
| GB | 2275409 A | 8/1994 |
| JP | 1999289951 A | 8/1994 |
| JP | 3918150 B2 | 5/2007 |
| JP | 2004008207 A | 5/2007 |
| JP | 4114187 B2 | 7/2008 |
| KR | 19990045710 A | 6/1999 |
| KR | 101105832 B1 | 1/2012 |
| WO | 9615664 A1 | 7/1995 |
| WO | 1996015664 A1 | 5/1996 |
| WO | 2000076292 A1 | 6/1999 |
| WO | 2001022813 A2 | 4/2001 |
| WO | 2005053389 A1 | 6/2005 |
| WO | 2005108991 A2 | 11/2005 |
| WO | 2009040528 A1 | 4/2009 |
| WO | 2013184713 A1 | 12/2013 |
| WO | 2013184842 A1 | 12/2013 |
| WO | 2013191573 A1 | 12/2013 |
| WO | 2014104197 A1 | 7/2014 |
| WO | 2014107753 A1 | 7/2014 |
| WO | 2014134371 A1 | 9/2014 |
| WO | 2015071890 A1 | 5/2015 |
| WO | 2015081033 A1 | 6/2015 |
| WO | 2015116801 A2 | 8/2015 |
| WO | 2015164849 A1 | 10/2015 |
| WO | 2016036921 A1 | 3/2016 |
| WO | 2016039390 A1 | 3/2016 |
| WO | 2016115107 A1 | 7/2016 |
| WO | 2016128964 A1 | 8/2016 |
| WO | 2016196215 A1 | 12/2016 |
| WO | 2016207430 A1 | 12/2016 |
| WO | 2017006294 A1 | 1/2017 |
| WO | 2017093555 A1 | 6/2017 |
| WO | 2017155300 A1 | 9/2017 |
| WO | 2017175927 A1 | 10/2017 |
| WO | 2017200314 A1 | 11/2017 |
| WO | 2018013081 A1 | 1/2018 |
| WO | 2018013082 A1 | 1/2018 |
| WO | 2018013209 A1 | 1/2018 |
| WO | 2018013210 A1 | 1/2018 |
| WO | 2018013334 A1 | 1/2018 |
| WO | 2018075119 A1 | 4/2018 |
| WO | 2018078899 A1 | 5/2018 |
| WO | 2018081765 A1 | 5/2018 |
| WO | 2018091927 A1 | 5/2018 |
| WO | 2018091929 A1 | 5/2018 |
| WO | 2018091930 A1 | 5/2018 |
| WO | 2018091931 A1 | 5/2018 |
| WO | 2018075119 A3 | 6/2018 |
| WO | 2018118123 A1 | 6/2018 |
| WO | 2018131840 A1 | 7/2018 |
| WO | 2018131851 A1 | 7/2018 |
| WO | 2018131853 A1 | 7/2018 |
| WO | 2018134550 A1 | 7/2018 |

(56) References Cited

FOREIGN PATENT DOCUMENTS

| | | |
|---|---|---|
| WO | 2018183277 A1 | 10/2018 |
| WO | 2018183279 A1 | 10/2018 |
| WO | 2018183281 A1 | 10/2018 |
| WO | 2018226062 A1 | 12/2018 |
| WO | 2019011233 A1 | 1/2019 |
| WO | 2019011234 A1 | 1/2019 |
| WO | 2019011235 A1 | 1/2019 |
| WO | 2019011231 A1 | 3/2019 |
| WO | 2019112831 A1 | 6/2019 |
| WO | 2019112833 A1 | 6/2019 |
| WO | 2019112834 A1 | 6/2019 |
| WO | 2019112835 A1 | 6/2019 |
| WO | 2019221014 A1 | 11/2019 |

OTHER PUBLICATIONS

FlyWeb PLUS, Light attract and trap flying insects <URL: https://www.amazon.com/Gardner-Fly-Web-Trap-FlyWeb/dp/B0115HO60G> (Retrieved online: Mar. 17, 21) Published/Accessed: Jan. 9, 2009 (8 pages).
International Search Report and Written Opinion of the International Searching Authority from corresponding PCT Application No. PCT/US2020/050705, dated Dec. 1, 2020 (11 pages).
International Search Report and Written Opinion in International Application No. PCT/US2022/033357 date Feb. 6, 2023.

\* cited by examiner

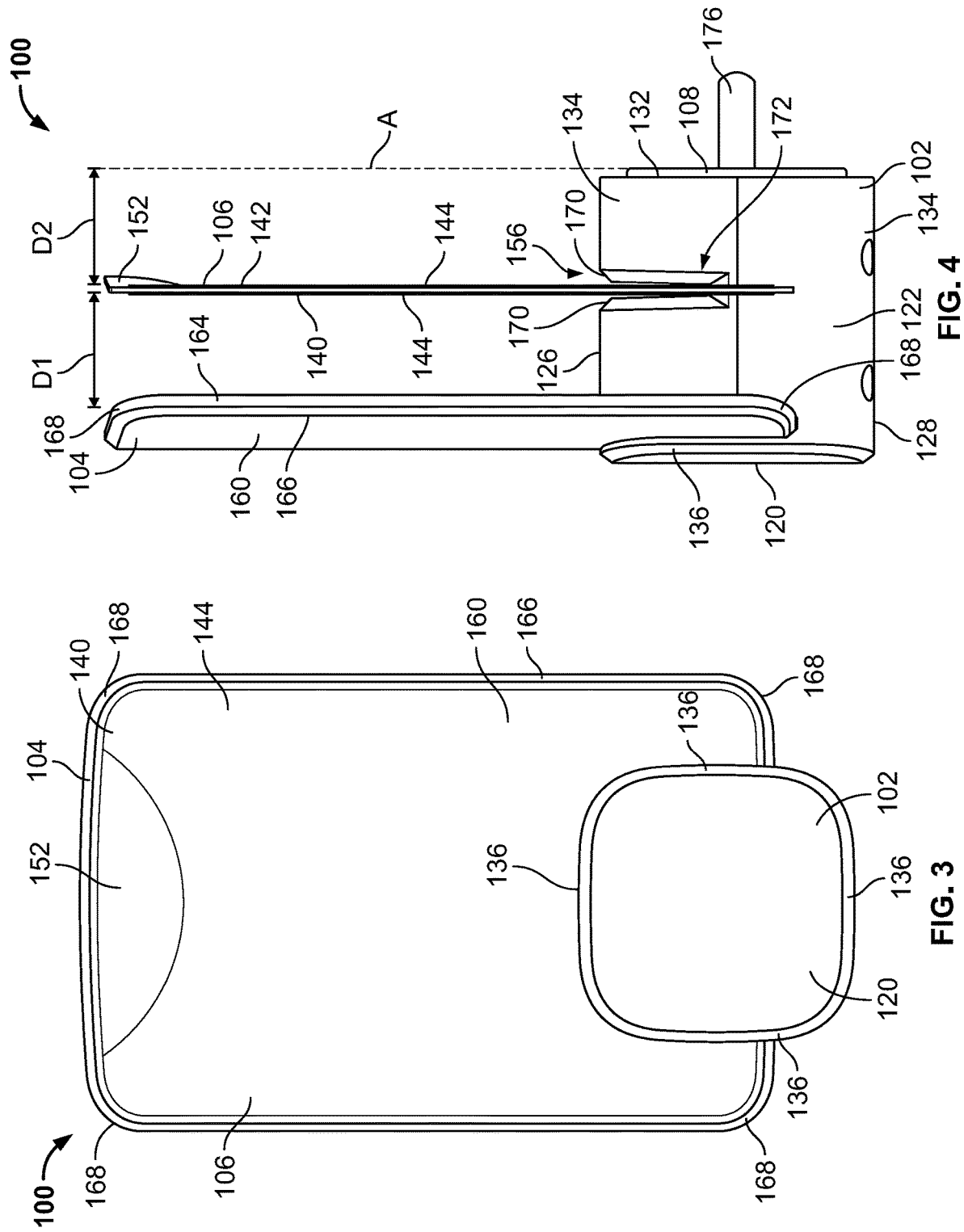

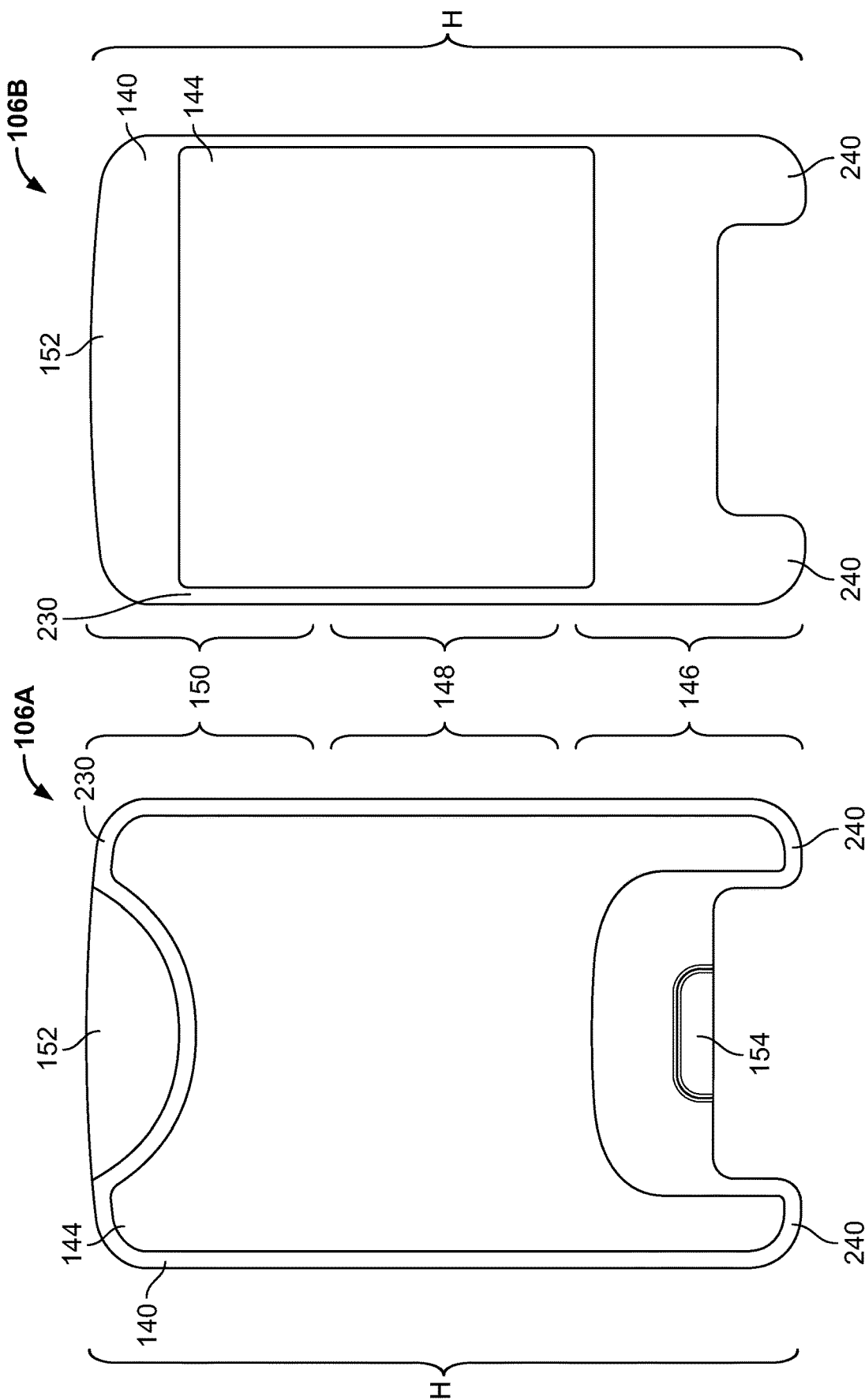

INSECT TRAP DEVICE

CROSS REFERENCE TO RELATED APPLICATIONS

This application is a continuation of U.S. patent application Ser. No. 16/653,430, filed Oct. 15, 2019, which is hereby incorporated by reference in its entirety herein.

REFERENCE REGARDING FEDERALLY SPONSORED RESEARCH OR DEVELOPMENT

Not applicable.

BACKGROUND OF THE DISCLOSURE

1. Field of the Disclosure

The present disclosure generally relates to a plug-in insect trap, and more specifically, to a plug-in insect trap device comprising a light guide and an entrapment substrate.

2. Description of the Background of the Disclosure

Insect traps are generally used to monitor or reduce populations of insects or other arthropods, by trapping individual insects and causing the insects to become incapacitated or die. Many passive or non-electrically-based insect traps use food, visual lures, chemical attractants, and/or pheromones to attract the insects, and are installed so as to limit or reduce unintended interaction with such traps by other types of insects or animals. Active or electrically-based insect traps can utilize visual lures such as light, bright colors, and shapes to attract insects, and may further use chemical attractants and/or pheromones.

Insect traps can vary widely in shape, size, and construction, and can be developed for a particular or targeted species of insect. For example, light traps, which may be used with or without ultraviolet light, attract certain types of insects. Light sources may include fluorescent lamps, mercury-vapor lamps, black lights, or light-emitting diodes (LEDs). Designs differ according to the behavior of the insects being targeted, and light traps are typically used to attract flying and terrestrial insects. Adhesive traps are sticky traps that can be simple flat panels or enclosed structures. Adhesive traps are often baited, and ensnare insects with an adhesive substance. However, users may not desire to use insect traps that utilize chemicals or bait because of various considerations.

Numerous active or electrically-powered insect traps are also known in the art. Electroshocking devices, sometimes referred to as "zappers," attract insects via a light source to an electrostatically charged kill grid. The lights are used to attract the insects and an electrified grid zaps insects out of the air and into a tray or on the ground below. Some electroshocking insect traps include a removable collection chamber. However, such traps can be dangerous for other small animals, pets, or children, if such traps are placed in a location that small animals, pets, or children can reach.

Therefore, it would be desirable to have the advantages of both active and passive systems without the disadvantages, which include having to use chemicals and/or electroshocking kill grids. The present disclosure eliminates certain disadvantages by combining a substrate typically found in passive systems with a light source that is typically used in the context of active systems.

SUMMARY

According to one aspect, an insect attractant device, includes a housing, an electronics assembly, a lens, and a substrate. The housing includes a rear face. The electronics assembly includes a first resistor and a first LED. The lens is disposed along the housing. The substrate is disposed between the lens and the rear face and includes first and second lateral portions that are configured to straddle the housing. The substrate is spaced apart from the lens and defines a first distance therebetween. The substrate is spaced apart from the rear face defining a second distance therebetween. The first distance is between about 15 mm and about 30 mm, and the second distance is between about 10 mm and about 20 mm.

In some embodiments, the insect attractant device further comprises a power source that extends from the rear of the housing. In some embodiments, the substrate is substantially planar. In some embodiments, the first LED is one of a plurality of LEDs. In some embodiments, the plurality of LEDs are ultraviolet LEDs. In some embodiments, the substrate includes an adhesive applied to at least a first face. In some embodiments, the substrate is removably attached to the housing.

According to another aspect, an insect attractant device includes a housing, an electronics assembly, a lens, and a substrate. The electronics assembly includes a first resistor and a first LED. The lens is disposed along the housing. The substrate is disposed along the housing and includes first and second lateral portions that are configured to straddle the housing. The substrate is spaced apart from the lens, defining a first distance therebetween. The first distance is between about 15 mm and about 30 mm.

In some embodiments, the housing defines a rear face, and the substrate is spaced apart from the rear face defining a first distance therebetween, the first distance being between about 10 mm and about 20 mm. In some embodiments, the housing defines a planar slot, and the substrate is received into the planar slot. In some embodiments, the planar slot includes chamfered slot edges, the chamfered slot edges being configured to assist in guiding placement of the substrate along the housing. In some embodiments, the substrate is of a form that is substantially planar, and a rigidity of the substrate is sufficient to maintain the form of the substrate. In some embodiments, the first LED is one of a plurality of LEDs. In some embodiments, the substrate includes an adhesive applied to at least a first face.

According to another aspect, an insect attractant device include a housing, an electronics assembly, a lens, and a substrate. The housing defines a rear face. The electronics assembly includes a first resistor and a plurality of LEDs. The lens is disposed along the housing. The substrate is disposed between the lens and the rear face, and includes first and second lateral portions that are configure to straddle the housing. The substrate is spaced apart from the rea face defining a first distance therebetween, and the first distance is between about 10 mm and about 20 mm.

In some embodiments, the insect attractant device further includes a power source extending from the rear face of the housing. In some embodiments, the substrate is spaced apart from the lens defining a second distance therebetween, and the second distance is between about 15 mm and about 30 mm. In some embodiments the substrate is substantially planar. In some embodiments, the substrate includes an adhesive applied to a first face and a second face, the adhesive being surrounded by an adhesive-free border on the first and the second face. In some embodiments, the lens includes a chamfered edge that directs light in a direction of the substrate.

According to another aspect, an insect attractant device includes a housing, an electronics assembly, a lens, and a substrate. The housing includes a rear face. The electronics assembly includes a first resistor and a first LED. The lens is disposed along the housing. The substrate is between the lens and the rear face, and includes first and second lateral portions that are configured to straddle the housing. The substrate is spaced apart from the lens and defines a first distance therebetween. The substrate is spaced apart from the rear face defining a second distance therebetween. The first distance is between about 5 mm and about 50 mm, and the second distance is between about 5 mm and about 50 mm.

In some embodiments, the first distance is between about 10 mm and about 50 mm. In some embodiments, the second distance is between about 10 mm and about 50 mm. In some embodiments, the first distance is larger than the second distance.

According to another aspect, a method of providing an insect attractant system includes providing a base and providing a substrate. The base defines a planar slot. The substrate includes a planar lower portion and a grip portion positioned opposite the planar lower portion. The planar lower portion is configured to be received into the planar slot. The planar lower portion includes a first lateral portion and a second lateral portion. The first and second lateral portion are configured to straddle the base when the planar lower portion of the substrate is received into the planar slot.

BRIEF DESCRIPTION OF THE DRAWINGS

FIG. 3 is a front elevational view of the insect trap of FIG. 1;

FIG. 4 is a left side elevational view of the insect trap of FIG. 1;

FIG. 11 is a front elevational view of a first embodiment of a refill for use with the insect trap of FIG. 1;

FIG. 12 is a front elevational view of a second embodiment of a refill for use with the insect trap of FIG. 1;

DETAILED DESCRIPTION OF THE DRAWINGS

Figure 2:
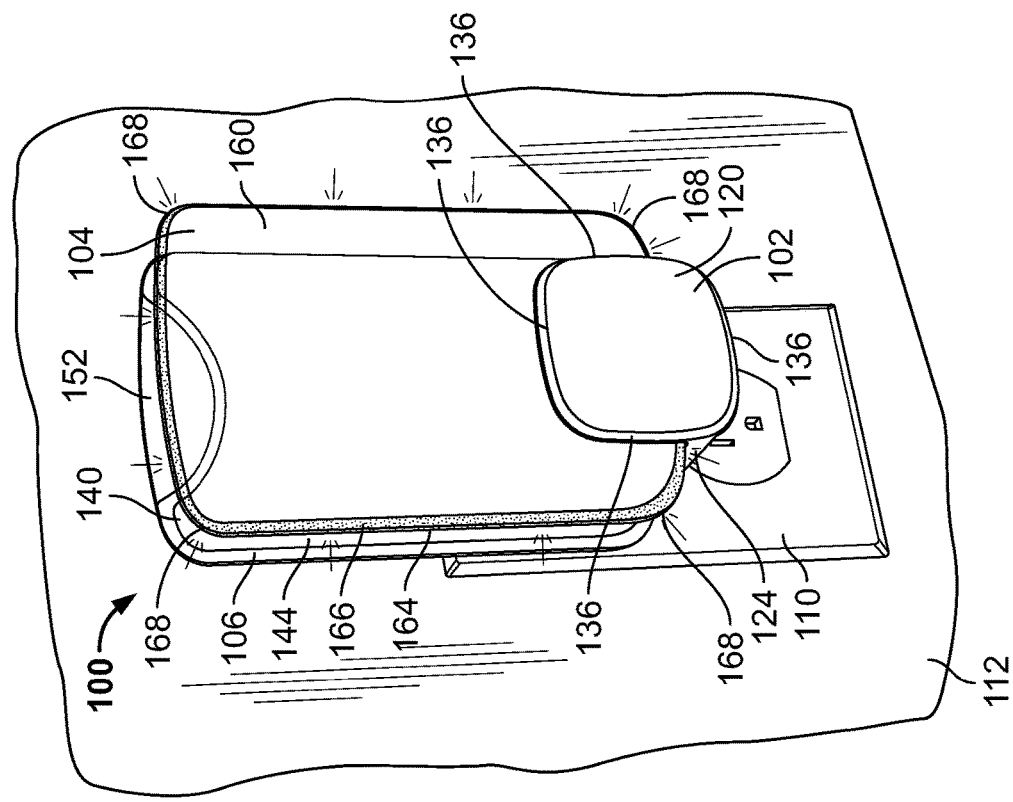
FIG. 2 is a front, left isometric view of the insect trap of FIG. 1 shown in an activated state.
Figure 1:
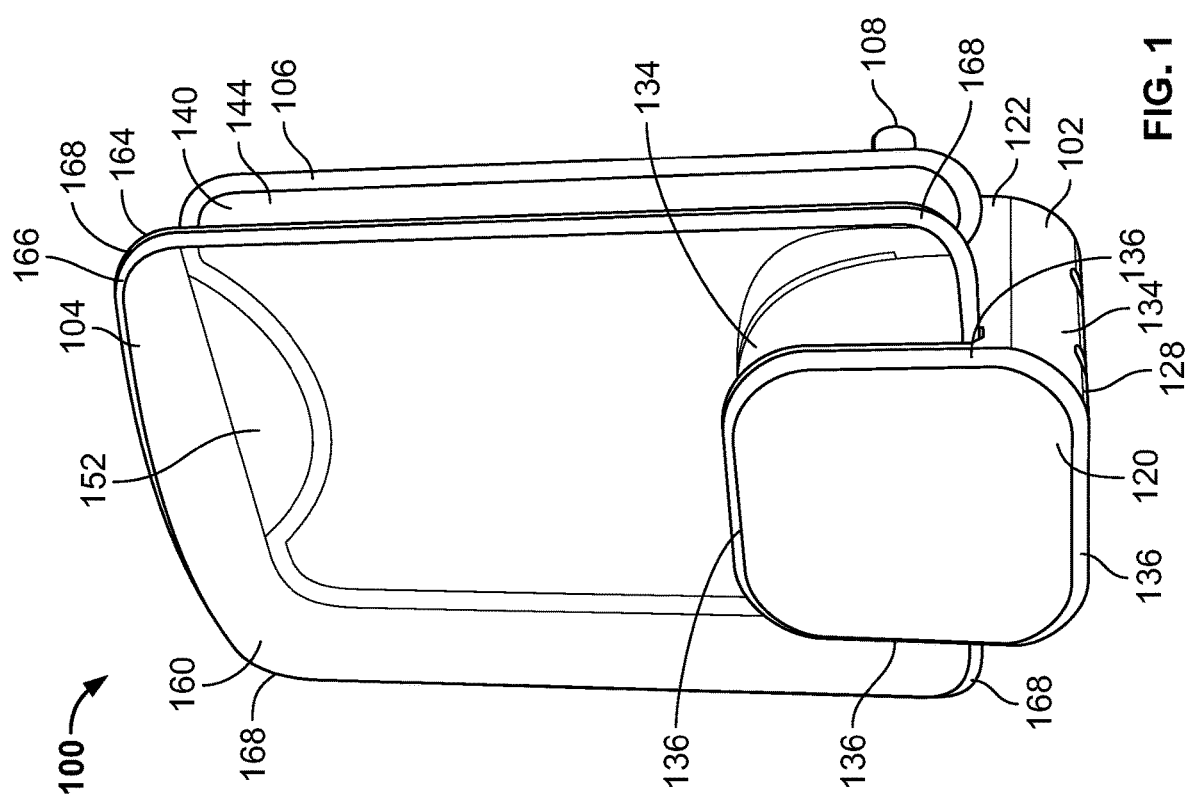
FIG. 1 is a front, right isometric view of a first embodiment of an insect trap including a refill.
Figure 5:
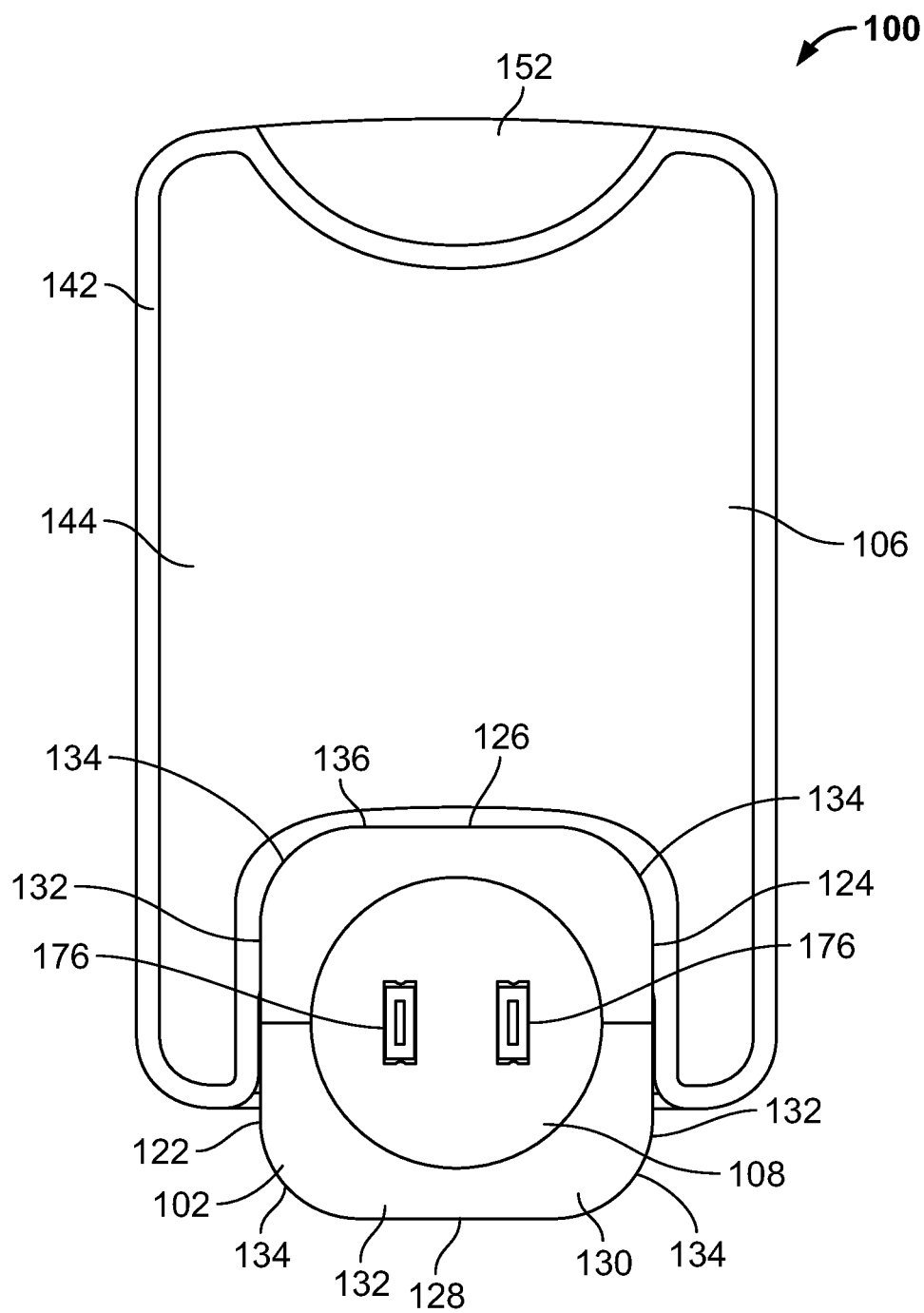
FIG. 5 is a rear elevational view of the insect trap of FIG. 1.

The present disclosure provides solutions for catching flying insects without the use of insecticides. In one particular implementation, light is guided through a front lens to attract flying insects to an insect trap device. As disclosed hereinafter below, in some embodiments blue light and UV light are emitted, the combination of which has been found to be an effective way to attract certain insects. Once attracted to the device, a double-sided adhesive refill catches the insects. The refill is disposable and may have adhesive portions that are specifically colored to attract certain insects in combination with the UV light. The refill may include an easy-to-peel feature, one or more grips for a user to grasp the refill, and/or a "lock-in" feature, among other advantages. The insect trap device described herein has been found to work well at attracting and catching insects during the daytime, which is typically a difficult time to attract insects. Through testing, it has been determined that the daytime efficacy may be attributed to one or more of the front lens characteristics, the refill material colors and/or pattern, the use of a double sided adhesive, and/or the inclusion of UV LEDs.

Still further, because users may be incentivized to use the insect trap device disclosed herein in non-conventional locations for insect traps, e.g., visible locations within a home, the efficacy of the device may be improved over other devices. Users may be embarrassed that they have insects in their home, and may not want to draw attention to this fact. Because of the crisp and attractive profile of the device described herein, including the compact profile of the housing that holds the electronic components, users may freely display the insect trap within their homes in a similar fashion as a nightlight or a Glade® fragrance diffuser. Presently available light-based insect trap devices are not intended to be kept out in a similar fashion, since such devices have the appearance of a pest control product, and many such products use electroshock as a form of monitoring or eliminating insects.

While the devices disclosed herein may be embodied in many different forms, several specific embodiments are discussed herein with the understanding that the embodiments described in the present disclosure are to be considered only exemplifications of the principles described herein, and the disclosure is not intended to be limited to the embodiments illustrated. Throughout the disclosure, the terms "about" and "approximately" mean plus or minus 5% of the number that each term precedes.

Now referring to FIGS. 1-7, an insect trap device 100 is shown that provides home ambiance while continuously catching insects. The device 100 includes a base 102, a lens 104 through which UV light is emitted, and a removable substrate or refill 106. A rotatable plug 108 extends outward from a rear side of the base 102. The device 100 is shown in an assembled, non-active state in FIG. 1, while the device 100 is shown in an active state, plugged into a wall socket 110 along a wall 112 and switched "on" in FIG. 2. As discussed in greater detail below, the light produced by the light source within the base 102 is directed through the lens 104 and onto the wall 112 surrounding the socket 110 adjacent the device 100.

Still referring to FIGS. 1-7, the base 102 comprises a sleek profile with a first or front face 120, a second or right face 122, a third or left face 124, a fourth or top face 126, a fifth or bottom face 128, and a sixth or rear face 130. The front face 120 is slightly bowed, while the top, bottom, left, and right faces 122, 124, 126, 128 are connected at rounded edges while defining relatively flat or planar central face portions. An inner portion of the rear face 130 is interrupted by the plug 108. For purposes of the present disclosure, portions of the plug 108 form the rear face 130.

Referring specifically to FIGS. 1-4, the base 102 defines a shape similar to an elongate rounded square. However, the base 102 may have a cross section of varying geometries. To that end, the base 102 may define overall dimensions, including a length, width, and height that are the about the same. While certain dimensions of the base 102 may be similar, the edges of the base 102 may have varying shapes or properties. In the embodiment of FIGS. 1-7, the base 102 includes first or rear edges 132 defining the rear face 130 that are sharp; second or medial edges 134 partially defining the top, bottom, left, and right faces 122, 124, 126, 128 that are rounded; and third or front edges 136 defining the front face 120 that are beveled or chamfered. While the embodiment of FIGS. 1-7 includes three different types of edges, the base 102 may be defined by one type of edge, or by two types of edges, or by three or more types of edges, e.g., chamfered, angled, rounded, sharp, etc. In the embodiment of FIGS. 1-7, the base 102 defines a generally rounded cuboid shape comprising 12 edges, wherein four edges are first edges 132, four edges are second edges 134, and four edges are third edges 136. The number and types of edges may vary in alternative embodiments.

Referring specifically to FIG. 4, the lens 104 is shown spaced apart from the refill 106. A first distance D1 separates the lens 104 and the refill 106. The first distance D1 may be between about 5 mm and about 50 mm, or between about 10 mm and about 40 mm, or between about 15 mm and about 30 mm, or may be about 20 mm. It is contemplated that the lens 104 and/or the refill 106 may comprise varying shapes and that the distance D1 is measured from the greatest straight line distance between an inner surface of the lens 104 and a front face 140 of the refill 106. In another embodiment, the distance is measured from upper ends of the lens 104 and refill 106 between inner and outer surfaces, respectively.

The rear face 130 of the base 102 and the refill 106 are also spaced apart such that a second distance D2 separates the rear face 130 and the refill 106. The second distance D2 is measured from the greatest straight-line distance between a rear face 142 of the refill 106 and an axis A that extends vertically from an outermost point along the rear face 130 of the base 102. In another embodiment, the second distance D2 is measured between the rear face 142 of the refill 106 and the wall 112 to which the device 100 is plugged in. The second distance D2 may be between about 5 mm and about 50 mm, or between about 10 mm and about 40 mm, or between about 15 mm and about 30 mm, or may be about 20 mm.

Referring again to FIGS. 1-7, the refill 106 includes deliberate focal points to help guide a consumer with product interaction. The refill 106 includes the first or front face 140, the second or rear face 142, and adhesive-covered portions 144 along the front face 140 and the rear face 142. In some embodiments, the adhesive-covered portions 144 are identical or mirror images of one another. In some embodiments, the adhesive-covered portions 144 have different configurations. Referring specifically to FIGS. 11 and 12, which depict a first refill 106A and a second refill 106B, the refill 106 includes a base or lower portion 146, a medial portion 148, and an upper portion 150. The lower portion 146, the medial portion 148, and the upper portion 150 collectively comprise a body of the refill 106. The lower portion 146, the medial portion 148, and the upper portion 150 each comprise one third (⅓) of an overall height H of the refill 106.

A grip 152 is disposed along the upper portion 150 of the refill 106. Portions of the front face 140 and the rear face 142 define the grip 152. The grip 152 may define a half circle shape, or may define another shape. In some embodiments, the grip 152 includes a wider portion along the upper portion 150 without adhesive. The medial portion 148 is disposed between or intermediate the lower portion 146 and the upper portion 150 of the refill 106. The lower portion 146 of the refill 106A includes a refill retention mechanism or tab 154. The second refill 106B does not include the retention mechanism 154. The refill retention mechanism 154 can be removably engaged with the base 102 so that insects attracted by light emitted from the plurality of LEDs become trapped on the adhesive covered portions 144. As desired, a used refill 106 can be removed and discarded, to be replaced with a new refill 106.

The refill 106 comprises plastic, cardboard, or another disposable material. In one embodiment the refill 106 may be formed from crepe paper, printer paper, A4 paper, and/or other cellulosic materials. Additional examples of materials contemplated for the refill 106 may include plastics, polymers, fabrics, non-woven substrates, such as a PET non-woven substrate, and/or combinations thereof. Additionally, the refill 106 may include combinations of manufactured, natural, and/or recycled or reclaimed materials. As discussed above, the tab 154 may be received in a refill slot 156 in the base 102 to secure the refill 106 before active use of the device 100 has commenced.

In some embodiments, the refill 106 may be a first refill and the refill 106 may further include a second refill. In some embodiments, the first refill may be made of or incorporate one material and the second refill may be made of or incorporate a different material, such that the first and second refills are partially or entirely made of different materials. In some embodiments, the refill 106 may comprise one and/or two substrate layers. In other embodiments, the refill 106 may be comprised of three, four, five, six, or more substrate layers. In some embodiments, a second refill (see FIG. 19A) and/or a third refill (not shown) may be attachable through additional refill slots (not shown) into the housing. In some embodiments, the first refill and the second refill may be the same.

A further criterion that may be relevant in choosing a material for the refill 106 includes optimizing a thickness or caliper of the refill 106. For example, the refill 106 may have a thickness of about 0.15 millimeters (mm), or about 0.2 mm, or about 0.3 mm, or about 0.4 mm, or about 0.5 mm, or about 0.6 mm, or about 0.7 mm, or about 0.8 mm, or about 0.9 mm, or about 1.0 mm, or about 1.1, or about 1.2 mm, or about 1.3 mm, or about 1.4 mm, or about 1.5 mm, or about 1.6 mm, or about 1.7 mm, or about 1.8 mm, or about 1.9 mm, or about 2.0 mm, or about 3.0 mm, or about 5.0 mm. Rigidity or stiffness of the refill 106 may be a further criterion for consideration in choosing the material that forms the refill 106. Appropriate rigidity may aid in the appearance and stability of the refill 106 by reducing the amount of curl of the refill 106 over time, if impregnated with a composition, and/or when exposed to humid conditions. Similarly, in one embodiment, it is preferable to use a refill material with sufficient rigidity such that the refill 106 substantially maintains its form or shape when the refill 106 is assembled within the device 100 and/or in use.

Figure 6:
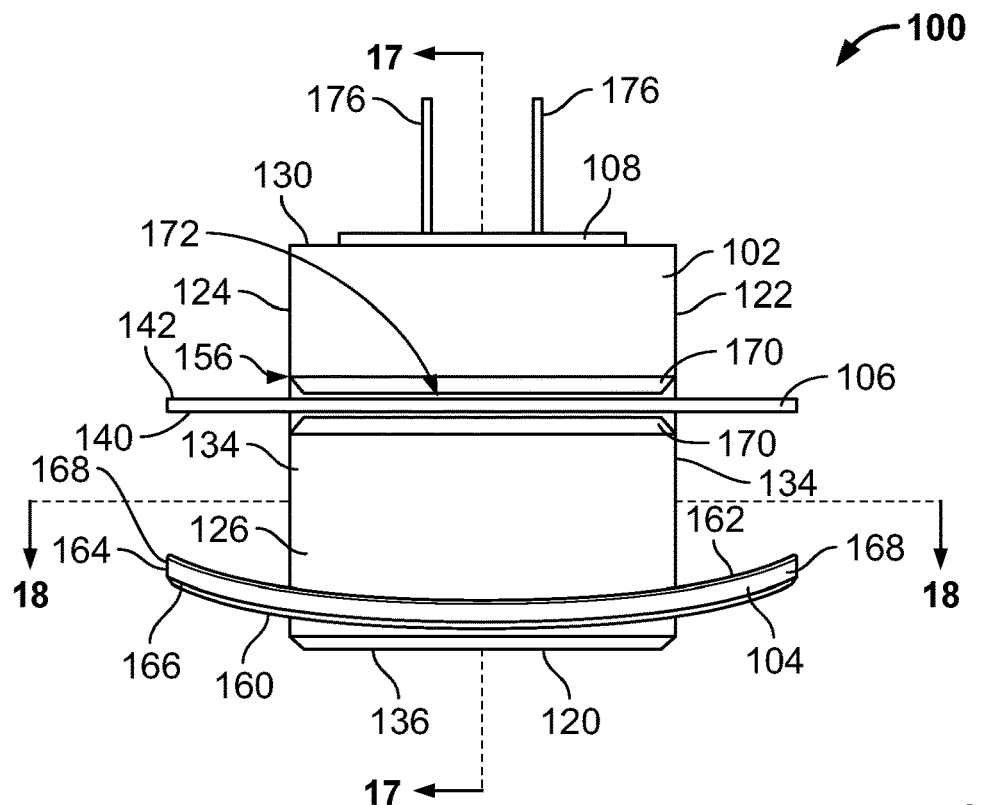
FIG. 6 is a top plan view of the insect trap of FIG. 1.
Figure 7:
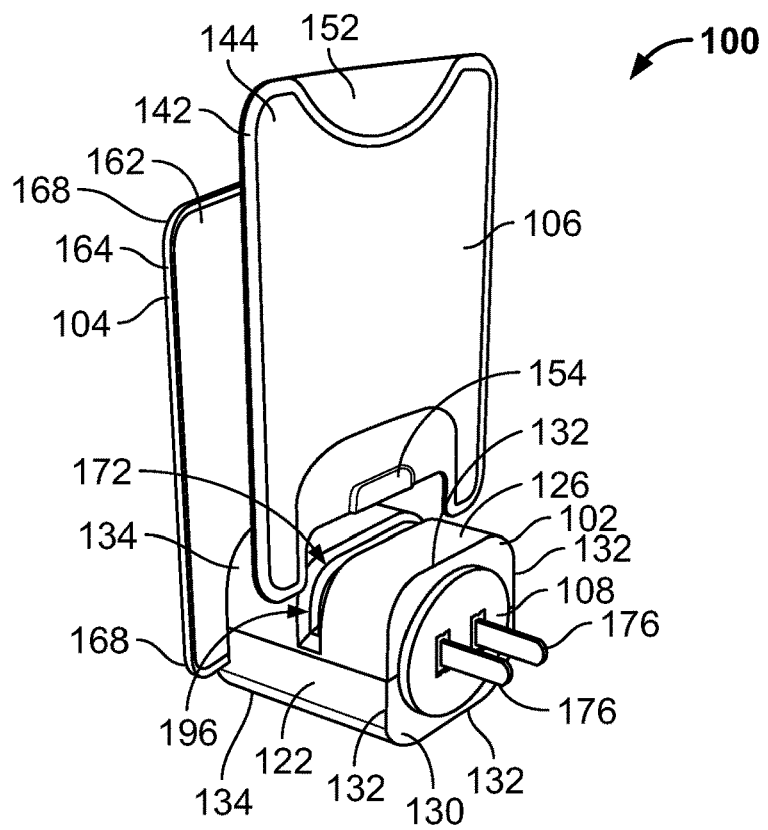
FIG. 7 is a rear isometric, partially exploded view of the insect trap of FIG. 1.

Referring to FIGS. 3, 4, 6, and 7, the lens 104 comprises a first or front lens surface 160, a second or rear lens surface 162, a third or side surface 164, and a fourth or chamfered surface 166. As discussed below, the geometry of the lens 104, and particularly the surfaces 160, 162, 164, 166 of the lens 104, create a lighting effect that draws insects toward the device 100 for capture. The front lens surface 160 of the lens 104 is generally bowed or concave. The chamfered surface 166 circumscribes and extends from the front surface 160. The chamfered surface 166 joins the side surface 164. The side surface 164 extends from the rear surface 162 to the chamfered surface 166. Both the front surface 160 and the rear surface 162 are generally uninterrupted surfaces. The front surface 160 comprises a semi-gloss texture and the rear surface 162 comprises a frosted texture. Referring specifically to FIGS. 6 and 7, corners 168 of the lens 104 are generally rounded, however, the corners 168 may also be sharp, or may include additional features. In some embodiments, the lens 104 includes five, or six, or seven, or eight, or nine, or ten corners.

The front surface 160 and the rear surface 162 of the lens 104 may be imparted with certain visual characteristics, such as frosting or adding a texture thereto, in order to help shield the refill 106 from view to prevent a user from seeing insects that are disposed along the refill 106. The lens 104 may have a wide variety of finishes along the front lens surface 160 and/or the rear lens surface 162 thereof. In some embodiments, the front lens surface 160 may have a finish of MT 11000 and the rear lens surface 162 may have a frosted texture of MT 11030. The front lens surface 160 may have a medium semi-gloss texture, while the rear lens surface 162 may have a frosted texture. Additional features that affect light dispersal may also be added to or disposed within the lens 104.

Figure 8:
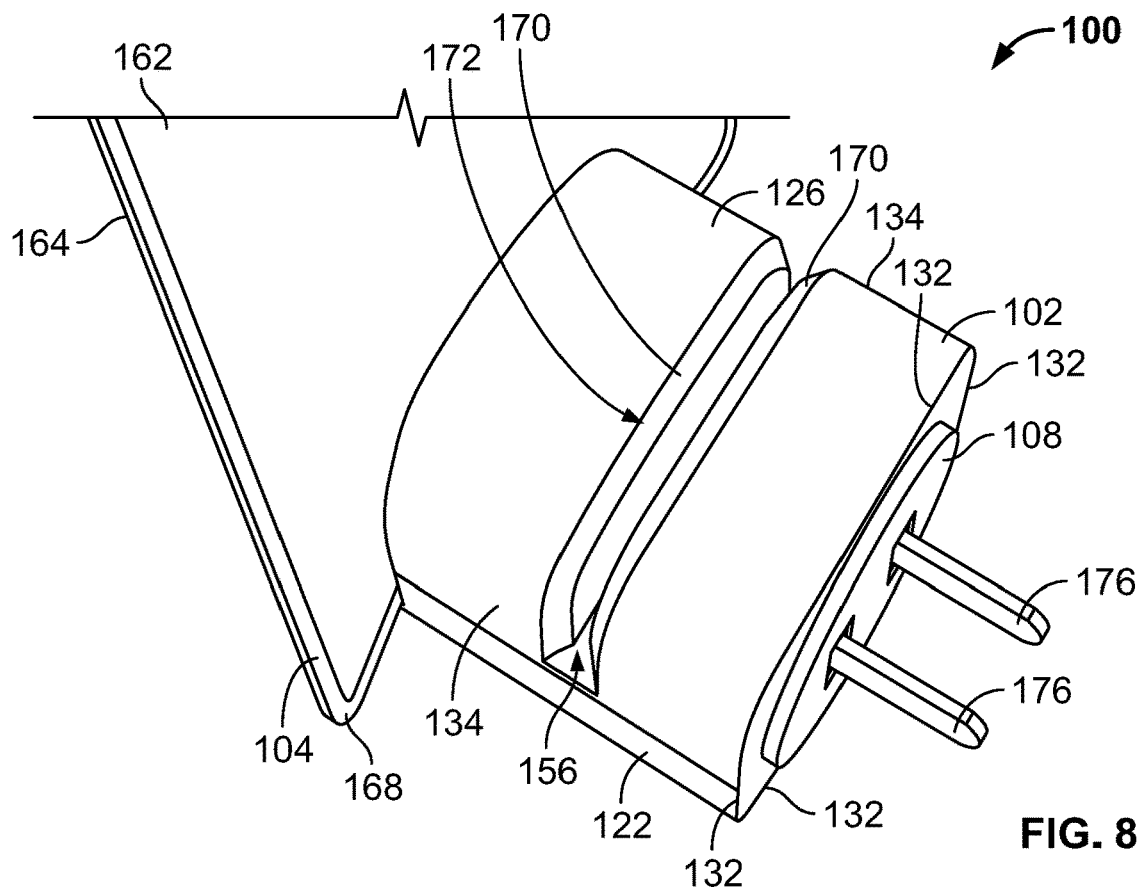
FIG. 8 is a partial rear, top isometric view of the insect trap of FIG. 1 with the refill having been removed.
Figure 9:
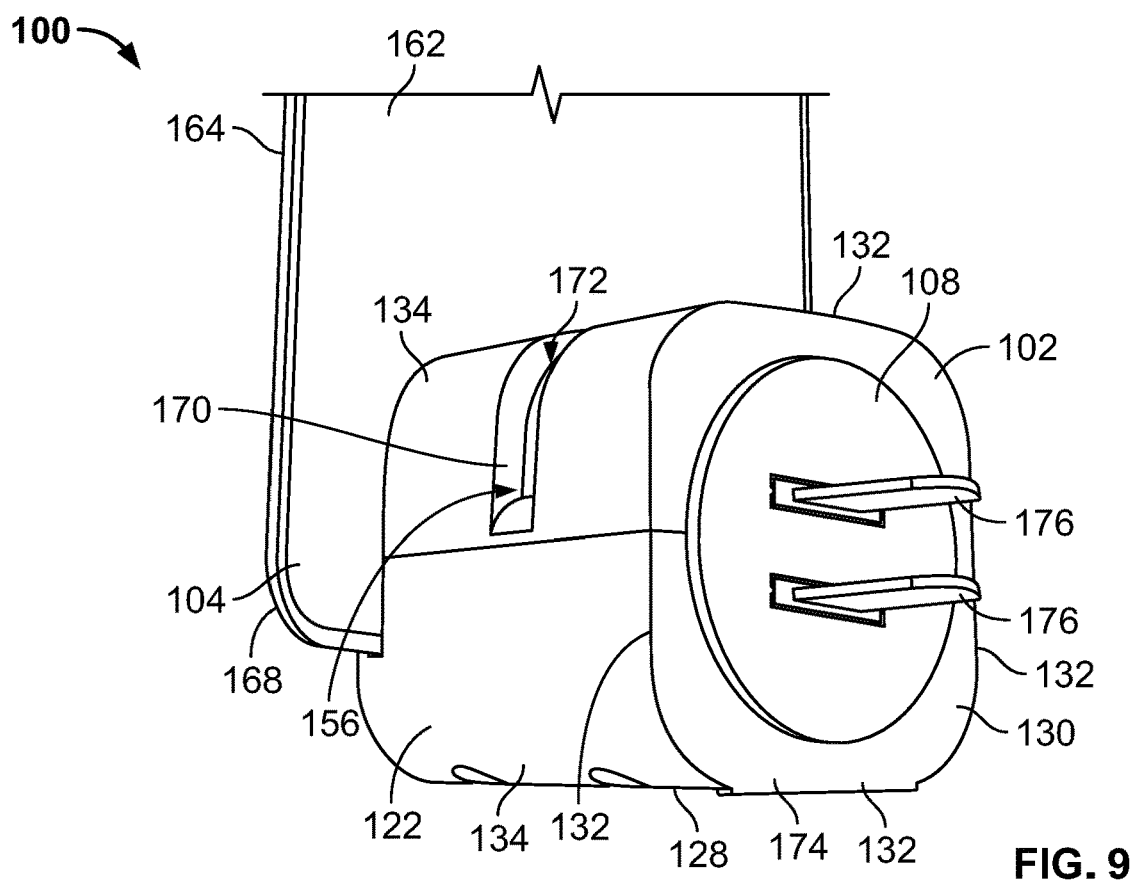
FIG. 9 is a partial rear, left isometric view of the insect trap of FIG. 8 with a plug having been rotated by about 90 degrees.

Referring to FIGS. 8 and 9, the refill slot 156 is shown in greater detail, which is disposed along the base 102. The refill slot 156 includes chamfered slot edges 170 that define an opening 172 into which the refill 106 can be inserted. The chamfered slot edges 170 that define the opening 172 assist in guiding placement of the refill 106 within the slot 156 and ultimately into a locked or secured configuration. In some embodiments, a slit (not shown) in the refill 106 can be aligned with a rib (not shown) in the base 102 to help align the refill 106 for insertion. The slit may be centrally located within the lower portion 146 of the refill 106. In some embodiments, detents (not shown) disposed along the lower portion 146 of the refill 106 can engage features or retention mechanisms within the base 102 to provide tactile feedback or an audible click, and to help secure the refill 106 to the base 102.

Still referring to FIGS. 8 and 9, the base 102 may include one or more feet 174 that allow the base 102 to stand upright, if needed. The one or more stabilizing feet 174 provide stability for the insect trap device 100 when the device 100 is resting on a flat surface. The insect trap device 100 may include more or fewer stabilizing feet 174 depending on the intended use of the device 100. Additional stabilizing features may be provided along the base 102, which may be used to retain the base in a certain configuration, such as upright. In some embodiments, additional features may extend from other surfaces of the base 102, which may aid in stabilizing or retaining the base 102 in a desired configuration.

Figure 10:
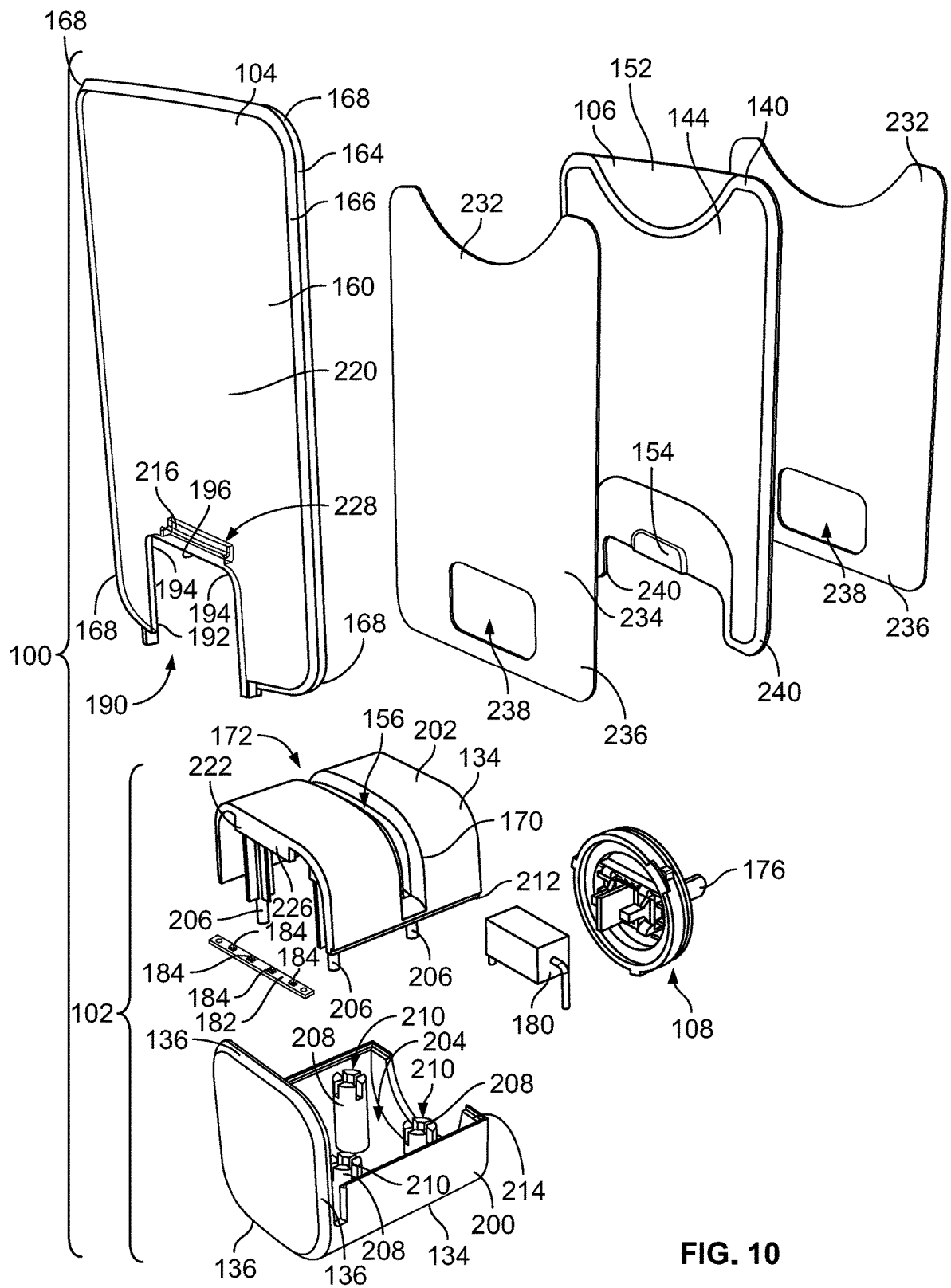
FIG. 10 is an exploded view of the insect trap of FIG. 1.

Continuing to refer to FIGS. 8 and 9, the plug 108 is shown in greater detail. The plug 108 is shown in a horizontal configuration (FIG. 8) and a vertical configuration (FIG. 9). Since the plug 108 is rotatable, electrical prongs 176 that extend from the plug 108 are capable of being rotated from the vertical configuration to the horizontal configuration. The plug 108 may be removable in some embodiments. The plug 108 is electrically coupled with the electrical components disposed within the base 102. The plug 108 may be a 360° rotating plug that allows for full rotation of the insect trap device 100 when the plug 108 is plugged into the wall 112. The plug 108 includes the electrical prongs 176, and may include a wide variety of electrical prong configurations, based on the electrical outlet configuration of different countries or jurisdictions. Referring to FIG. 10, the plug 108 is electrically coupled with at least one resistor 180. A printed circuit board (PCB) 182 is also coupled with one or both of the resistor 180 and the rotatable plug 108. A plurality of light sources, such as light emitting diodes (LEDs) 184 are disposed along the PCB 182. While the present disclosure refers to a plurality of LEDs 184, alternative light sources may be utilized, such as incandescent bulbs, or another type of lighting source known to those of ordinary skill in the art. Further, different types of light sources may be utilized that produce light having a wide variety of wavelengths. For example, while certain colors are described herein, many different colored lights that emit light having a variety of wavelengths are contemplated.

Referring to FIG. 10, the lens 104 is shown exploded from the base 102. The lens 104 further includes a cutout portion 190 that defines a fifth or inner surface 192 of the lens 104. The inner surface 192 may have angled or rounded portions to assist in allowing the lens 104 to act as a waveguide, as discussed below. Inner corners 194 of the inner surface 192 are generally rounded. The inner surface 192 comprises an upper inner surface 196, which is in direct optical communication with the plurality of LEDs 184. The upper inner surface 196 may be rounded or concave to assist in allowing the lens 104 to act as a waveguide. The plurality of LEDs 184 are disposed along the PCB 182, which is sized and shaped to fit along a platform 198 (see FIGS. 20 and 21) within the base 102. The lens 104 may have alternative configurations that allow the lens 104 to disperse light against the wall to which the device 100 has been plugged in, or that allow the lens 104 to disperse light in another way, as discussed in greater detail hereinafter below.

Still referring to FIG. 10, the base 102 includes a lower housing 200 and an upper housing 202 that is separate from the upper housing 202. The lower housing 200 defines the front face 120 of the base 102 and generally forms a well 204, while the upper housing 202 defines the refill slot 156, which receives the refill 106. The upper housing 202 and the lower housing 200 may be secured by a snap fit, an interference fit, magnets, adhesion, ultrasonic welding, screws, rivets, or any other method of coupling known to those of ordinary skill in the art. The upper housing 202 includes a plurality of posts 206 that depend downward from the upper housing 202 to engage with a plurality of post-receiving members 208 that are disposed along the lower housing 200. The post-receiving members 208 are cylindrical, and include circular bores 210 that are capable of receiving the posts 206 that depend from the upper housing 202. An inset ledge 212 along the upper housing 202 is configured to be received by a complementary ledge 214 disposed along a periphery of the lower housing 200. The upper housing 202 and the lower housing 200 are configured to be permanently or semi-permanently attached to one another once all of the internal components have been assembled within the base 102.

Still referring to FIG. 10, the upper housing 202 includes one or more retention mechanisms, such as hasps, clasps, clips, rails, slots, catches, pins, fasteners, and/or a combination thereof that extend from an underside of the upper housing. The one or more retention mechanisms may be formed to retain one or both of the refill 106 and the lens 104, as discussed below. The plurality of LEDs 184 are disposed along the PCB 182, which is positioned adjacent the lower housing 200. The LEDs 184 are directed toward a waveguide entrance to the lens 104, as discussed in greater detail below. The resistor 180, which may be one of a plurality of resistors, is disposed within the base 102. The lens 104, which acts as a waveguide, is disposed between and adjacent the upper housing 202 and lower housing 200.

As noted above, the lens 104 may act as an optical waveguide. When attached near the front of the base 102, the lens 104 surrounds and extends partly through a slot 156 in the lower housing 200. With the lens 104 thus installed, a hooked tab 216 on the lens 104 overlays the LEDs 184 to capture light for transmission outside of the base 102. The hooked tab 216 is partially defined by the upper inner surface 196. As noted above, the upper inner surface 196 acts as a waveguide coupling surface. Waveguides are used to mix and/or direct light emitted by one or more light sources, such as the one or more LEDs 184. A typical optical waveguide includes three main components: 1) one or more coupling surfaces or elements, 2) one or more distribution elements, and 3) one or more extraction elements. In the present embodiment and referring to FIG. 10, the coupling component is the upper inner surface 196 of the lens 104. Once the light enters into the upper inner surface 196, the light can be directed into the distribution element, which in this case is a body 220 of the lens 104. The chamfered surface 166, the side surface 164, the front surface 160, and/or the rear surface 162 may act as extraction elements. Depending on the desired exit of light from the lens 104, the surfaces of the lens 104 may be adjusted to create different refraction, reflection, total internal reflection, and surface or volume scattering to control the distribution of light injected into the lens 104 by the LEDs 184 through the upper inner surface 196. In a preferred embodiment, the light emitted by the LEDs 184 is refracted by the chamfered surface 166 toward the wall 112 to which the device 100 is electrically coupled.

In order for an extraction element to remove light from the waveguide, the light must first contact the feature comprising the element. By shaping the waveguide surfaces, one can control the flow of light across the extraction features and thus influence both the position from which light is emitted and the angular distribution of the emitted light. In the present disclosure, the lens 104 includes the chamfered surface 166, which is configured to refract light toward the refill 106, and, thus, the wall 112. Through testing, it has been determined that use of the chamfered lens surface 166 to refract light toward the wall 112 increases and encourages insects to come toward the refill 106 since the chamfered surface 166 directs light toward the wall 112. In some instances, during testing of the device 100 it has been found that substantially more insects become stuck along the rear face 142 of the refill 106, which may be caused, in part, by the light dispersed along the wall 112. In some embodiments, the chamfered surface 166 may be angled between about 20 degrees and about 70 degrees, or between about 30 degrees and about 60 degrees, or between about 40 degrees and about 50 degrees, or about 45 degrees.

Figure 14:
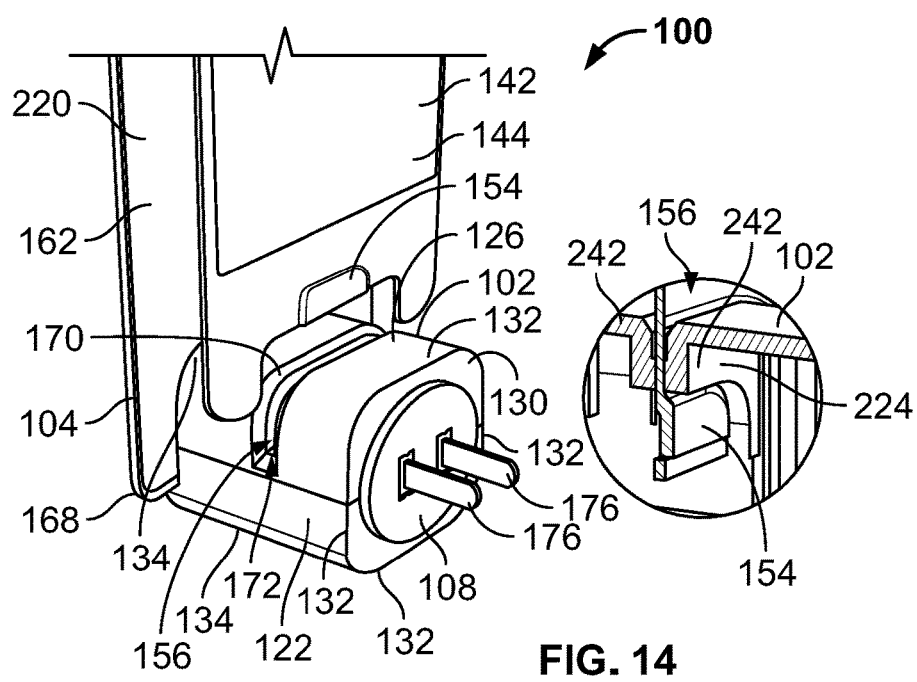
FIG. 14 is a partial, rear isometric view of the insect trap of FIG. 1 with a detail view illustrating the interaction between a tab along the refill and a slot of a retention mechanism within a housing.

Referring FIGS. 10 and 14, a first retention mechanism 222 (FIG. 10) and a second retention mechanism 224 (FIG. 14) are shown, which are each disposed along the upper housing 202 of the base 102. The first retention mechanism 222 retains the lens 104, while the second retention mechanism 224 retains the refill 106. The first and second retention mechanisms 222, 224 may be one of the retention mechanisms listed above. The first retention mechanism 222 permanently retains the lens 104 in place, while the second retention mechanism 224 releasably allows the refill 106 to be removed to be replaced with another refill. The first and second retention mechanisms 222, 224 may be integrally molded or formed with the upper housing 202. In some embodiments, one or both of the retention mechanisms 222, 224 may be provided along the lower housing 200.

In the present embodiment and referring to FIG. 10, the first retention mechanism 222 comprises a rail 226, which is received within a slot 228 defined by the hooked tab 216 of the lens 104. In an assembled state, the rail 226 is disposed within the slot 156 (see FIG. 20), and secures the lens 104 in place during assembly of the device 100. Referring to FIG. 14, the second retention mechanism 224 comprises a latch that receives the refill retention mechanism 154, i.e., the tab, once the refill 106 has been laterally inserted into place within the refill slot 156 of the upper housing 202.

Referring again to FIG. 10, the base 102 and the rotatable plug 108 are shown in an exploded configuration, the plug 108 including the electrical prongs 176, which are capable of being inserted into a power source, i.e., the socket 110 of FIG. 2. When the lens 104 is in an operable state, the LEDs 184 can be turned on to emit light onto the lens 104, which re-directs the light to outside of the base 102. The lens 104 is at least partially transparent, but, as noted above, may include a frosted or other finish along one or more of the surfaces. In some instances, the lens 104 may be considered translucent. When the LEDs 184 are illuminated, light is emitted from all sides of the lens 104 outside of the base 102. As discussed below, certain lighting configurations may be beneficial or enhance insect entrapment. The device 100 may include an external switch (not shown) to selectively turn on the LEDs 184 and/or the resistor 180.

Referring now to FIGS. 11 and 12, a first refill 106A and a second refill 106B are shown in detail. The refill 106 described herein can be substituted with either the first refill 106A or the second refill 106B. In some embodiments, the device 100 may include a second refill slot (not shown), which could receive a second refill that is the same or different than the first refill 106A or the second refill 106B. Certain features are common between the first refill 106A and the second refill 106B, such as the inclusion of adhesive within the adhesive-covered portions 144 along both the front side 140 and the back side 142 thereof. The adhesive-covered portions 144 cover a portion of the front side 140 and a portion of the back side 142 of the refill 106. An outer periphery 230 of both the first refill 106A and the second refill 106B does not include the adhesive. Rather, portions exterior to the adhesive-covered portions 144 can help users to grip the refill 106 for removal. Removable film or a peel-off layer 232 (see FIGS. 13 and 15) initially protects the adhesive-covered portions 144 and prevents objects or dust from becoming attached thereto prior to use of the film 232.

Figure 13:
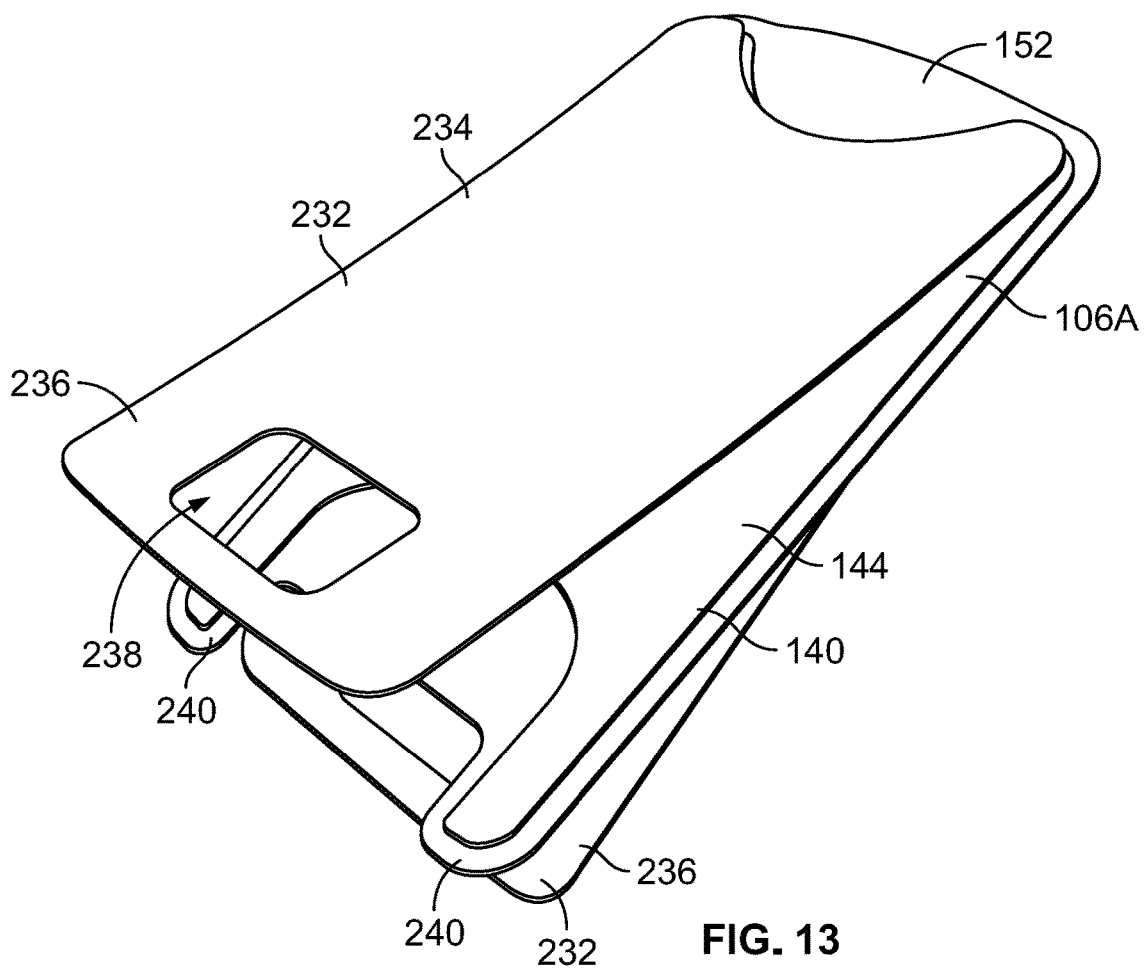
FIG. 13 is an isometric view of the refill of FIG. 11 having a peel-off layer partially removed.

The first and second refills 106A, 106B are stiff and do not warp. Each of the refills 106A, 106B includes the grip area 152, and may include features that allow the refills 106A, 106B to make a snapping noise or to be "seated" in a positive way that provides tactile feedback letting a user know the refill is in place. The refills 106A, 106B are formed to stay aligned, vertical, and parallel to the lens 104. The peel-off layer 232 may include branding or other types of information conveyed along an outer surface 234 thereof. Further, a peel away area 236 may be disposed at a lower end of the refills 106A, 106B which may force a user to remove the peel-off layer 232 in order to insert one of the refills 106A, 106B into the base 102. Referring to FIG. 13, a peel-off window 238 may be included along the peel off film 232. The window 238 may be provided to allow protrusions or tabs (such as the tab 154) extending from the refill 106 to be disposed therein. Alternative or additional features may be added to the peel-off film 232. As needed, including once the adhesive-covered portions 144 are covered with insects, the refill 106 can be removed from the base 102 and discarded. A new refill 106 can be attached to the base 102 for continued use of the device 100. The peel off film 232 is preferably attached to both the front side 140 and the rear side 142 of the refill 106. However, it is contemplated that only one of the front side 140 or the rear side 142 may include an adhesive portion and, thus, only require one peel off film.

Referring specifically to FIG. 11, the tab 154 is provided along the lower portion 146 of the first refill 106A. A second tab (not shown) may be provided along the opposing side, such that there are two tabs that extend from the refill 106 to allow the refill 106 to be locked into place within the base 102. The second refill 106B shown in FIG. 12 does not include the tab 154, thus, the second refill 106B does not include a retention mechanism. However, the absence of a retention mechanism does not prevent the second refill 106 from being retained in place within the base 102. Rather, alignment features within the base 102 may keep the second refill 106 in place within the refill slot 156 after the second refill 106 has been inserted therein. One particular alignment feature may be a rail (not shown) within the base 102 that could be received within a slit (not shown) within the lower portion 146 of the refill 106, which could aid in alignment of the refill within the refill slot 156. In some embodiments, the slit within the lower portion 146 of the refill 106 may be centrally disposed. In some embodiments, multiple slits are included within the lower portion 146 of the refill 106.

In some embodiments, a frangible portion (not shown) is included along the refill 106 to aid in removing the peel-off layer 232. To that end, the frangible portion may be coupled with the peel-off layer 232. The peel-off layer 232 may comprise a variety of known materials, including, for example, one or more of a polyester layer, a low density polyethylene layer, an aluminum foil layer, a polypropylene layer, and a low density polyethylene layer. Alternatively, the peel-off layer 232 may be replaced by some other covering mechanism, such as a rigid cover, so long as it can be removed or opened without damage to the adhesive. Such alternative covers could simply be removed or could slide to one side, be hinged, or otherwise be configured so as to be openable and even to be re-closable.

Referring to FIGS. 13-16, to install the refill 106 for use, the peel-off layers 232 are removed, exposing the adhesive provided on the front and rear faces 140, 142 of the refill 106. A user then grips the grip portion 152 of the refill 106, and inserts the refill 106 into the refill slot 156 in the upper housing 202 of the base 102. The refill 106 has a similar shape and size as the lens 104, so that the refill is substantially hidden from view from a front perspective. The adhesive-free border 230 surrounds the adhesive portions 144, with the grip area 152 along the upper portion 150 of the refill 106, which allows users to install and remove the refill 106 without touching the adhesive or any trapped insects.

Referring to FIGS. 13 and 14, to securely engage the base 102, the first refill 106A includes a reversed "saddle" geometry with opposing lateral portions or legs 240 that straddle the base 102. The lateral portions 240 may have adhesive applied thereto. The lateral portions 240 are mirror images of one another, however, the lateral portions 240 may be asymmetrical. The tab 154, which may be considered a projection or a boss, is disposed along the base or lower portion 146 of the refill within an adhesive-free region. Lowermost ends of the legs 240 are disposed below the tab 154. The lower portion 146 of the first refill 106A is inserted into the refill slot 156 so that the tab 154 snaps into engagement with either of two supports 242 inside of the upper portion 150 of the base 102. The first refill 106A may be configured to be inserted in either direction, such that the tab 154 snaps into engagement with either of the two supports 242 along the upper housing 202. With the first refill 106A thus seated in the refill slot 156, the legs 240 extend along opposite sides of the base 102. In some embodiments, the tab 154 is disposed along both sides of the first refill 106A, and the supports 242 within the base 102 receive both of the tabs 154. The first refill 106A may become disengaged from the base 102 by pressing a button (not shown), sliding the first refill 106A in a direction that causes disengagement, or by applying a force to the first refill 106A to remove it from the refill slot 156.

Figure 15:
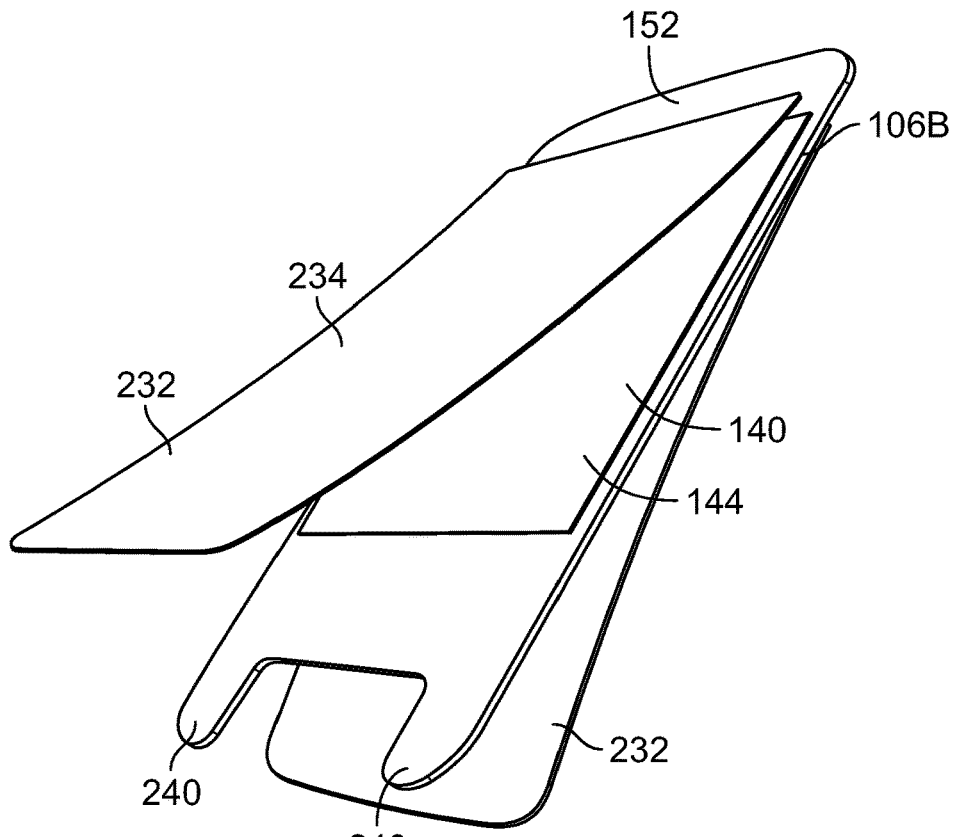
FIG. 15 is an isometric view of the refill of FIG. 12 having a peel-off layer partially removed.
Figure 16:
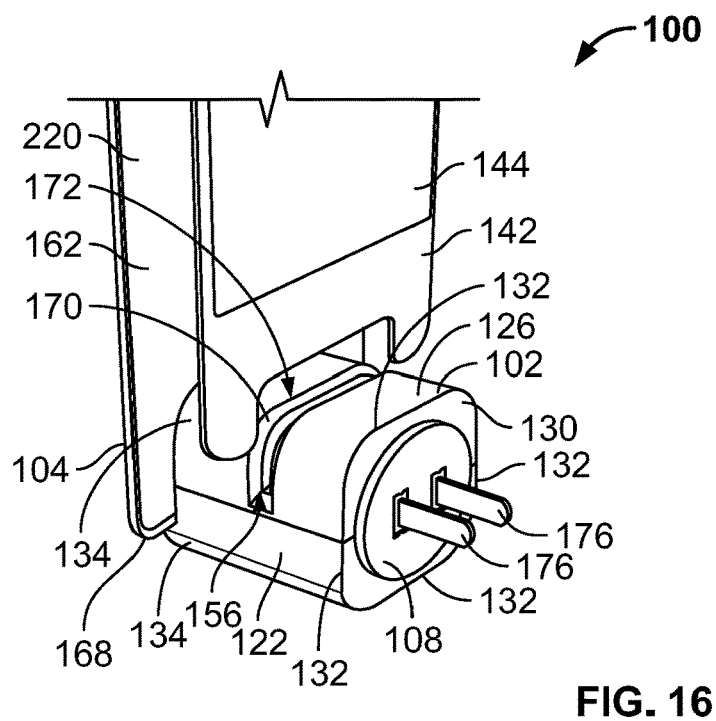
FIG. 16 is a partial, rear isometric view of the insect trap of FIG. 1 with the refill of FIG. 12 being inserted into a refill slot of the housing.

Referring to FIGS. 15 and 16, to securely engage the base 102, the second refill 106B also includes a reversed "saddle" geometry with opposing lateral portions or legs 240. The lower portion 146 of the second refill 106B is inserted into the refill slot 156 so that the lower portion 146 of the second refill 106B is securely disposed within the refill slot 156. The second refill 106B may also be configured to be inserted in either direction. In some embodiments, additional features may be provided along the lower portion 146 of the second refill 106B to aid in alignment or retention with the base 102. The second refill 106B may also become disengaged from the base 102 by pressing a button (not shown), sliding the second refill 106B in a direction that causes disengagement, or by applying a force to the second refill 106B to remove it from the refill slot 156.

It is also contemplated that variations may be desirable depending on the intended functionality of the insect trap device 100 and user preferences. Contemplated variations in the refill type may allow the refill to be insect specific. For example, certain colors, patterns, and/or features may be desirable to place along a portion of the refill 106 having adhesive to assist in attracting certain types of insects. Indeed, it is anticipated that many modifications may be made to provide variations to users during the use of a single insect trap device 100, for example, seasonal offerings or multiple design offerings to allow user selection of a desirable refill 106 for their insect trap device 100 and area of intended use. While such variation is anticipated, the base 102 may include attractant patches or mini-containers for general and specific insect types.

Figure 17:
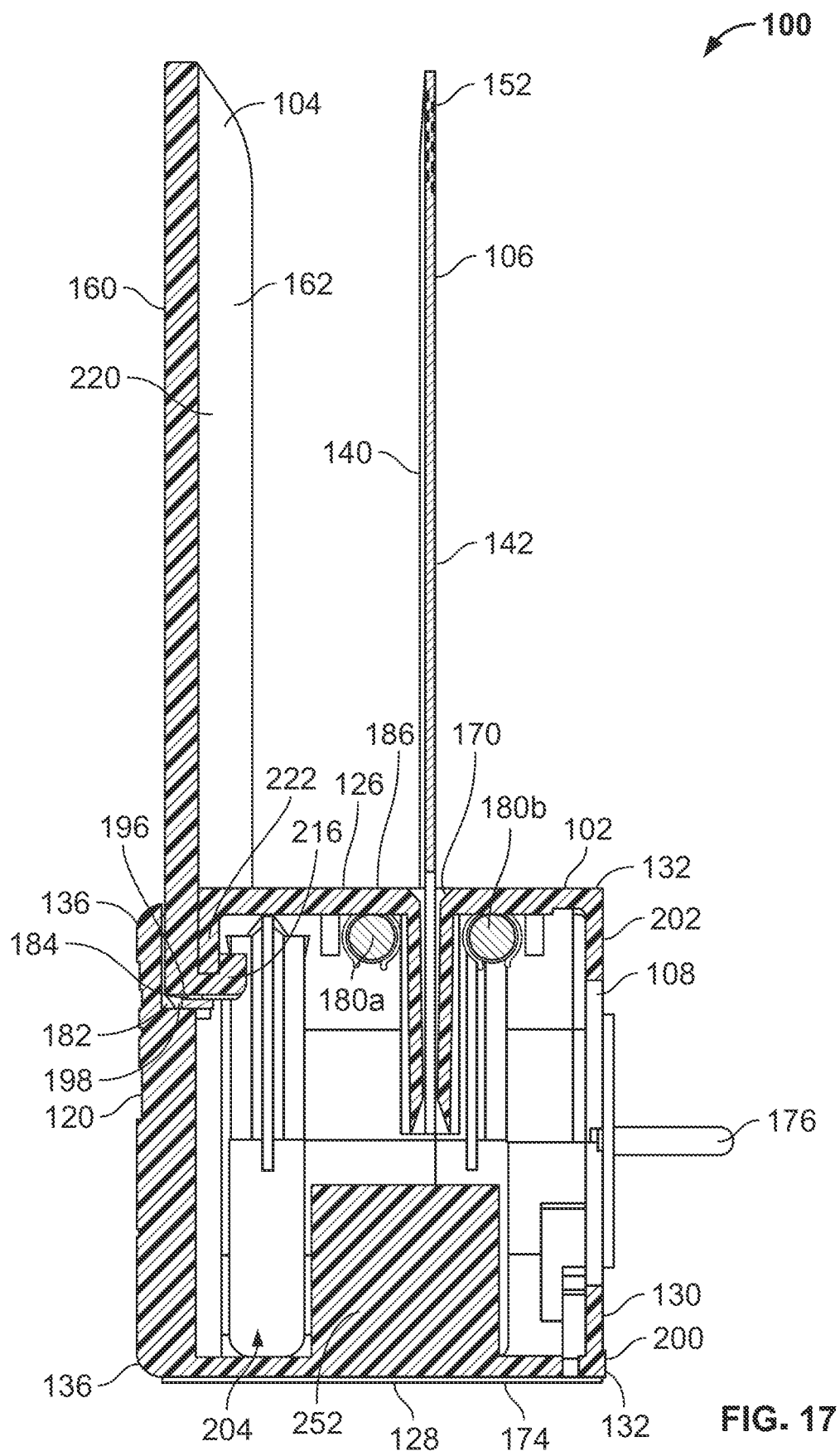
FIG. 17 is a cross-sectional view taken through line 17-17 of FIG. 6.
Figure 18:
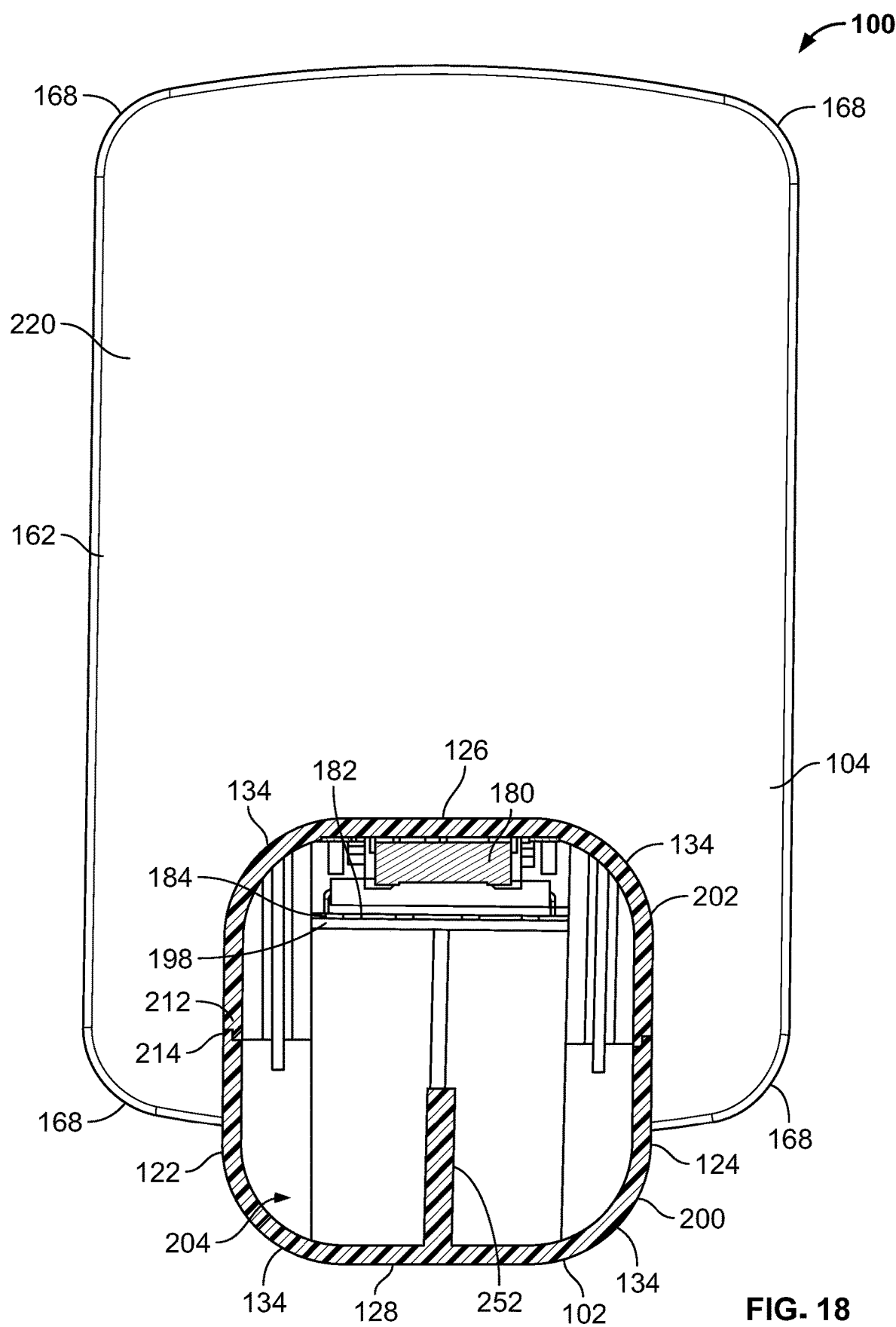
FIG. 18 is a cross-sectional view taken through line 18-18 of FIG. 6.
Figure 20:
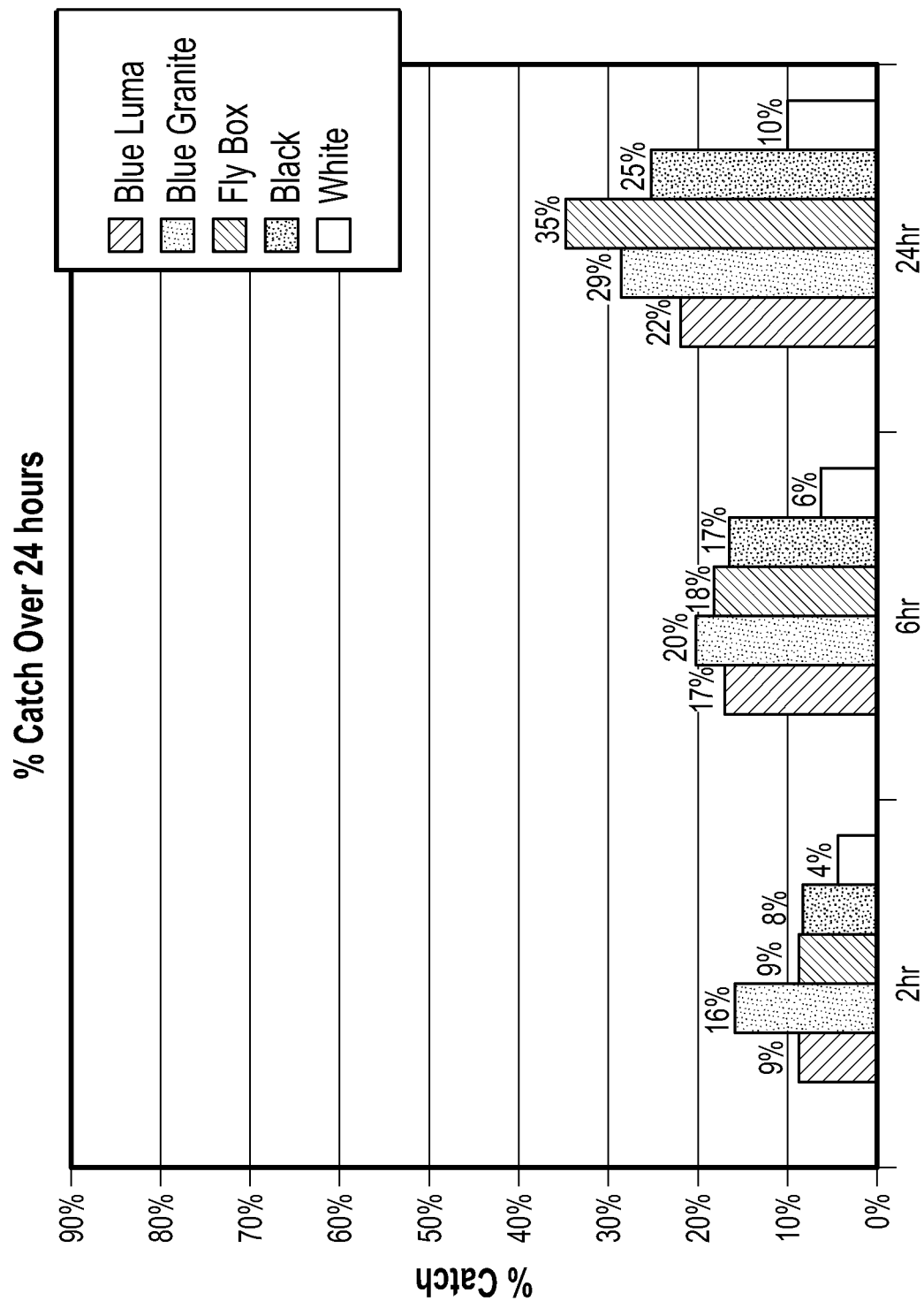
FIG. 20 is a bar graph illustrating differing catch percentages based on a color of the adhesive portion of a refill.

Referring now to FIGS. 17 and 18, cross-sectional views of the device 100 are shown taken through lines 17-17 and 18-18 of FIG. 6. The base 102 is generally hollow and includes a flange 252 that extends upward from the lower housing 200. The flange 252 is integral with the lower housing 200 and may be included for structural or manufacturing considerations. In some embodiments, additional flanges may extend from the lower housing 200 and/or the upper housing 202. Referring specifically to FIG. 20, a side cross-sectional view is shown. The lens 104 is shown coupled with the first retention mechanism 222. The circuit board 182 and the plurality of LEDs 184 are illustrated in optical communication such that when the LEDs 184 are turned on, light will shine through the lens 104. The circuit board 182 is shown resting upon the platform 198 formed by the wall 112 of the base 102. First and second resistors 180a, 180b are shown, adjacent and along the upper housing 202. As noted above, only one of the resistors 180a, 180b may be included in some embodiments. In other embodiments, three, or four, or five, or six, or seven, or eight resistors may be included. As shown, the resistors 180a, 180b are positioned vertically below the top face 126 of the base 102 (e.g., in a direction parallel to axis A shown in FIG. 4). The refill 106 is also shown disposed within the refill slot 156.

As further shown in FIG. 17, the first resistor 180a can be positioned within the base 102 directly below a space defined between the lens 104 and the refill 106 (e.g., in a direction parallel to axis A shown in FIG. 4). For example, the top face 126 can include a front portion 186, the front portion 186 positioned between the lens 104 and the refill 106. The first resistor 180a is positioned within the base 102 directly vertically below the front portion 186 (e.g., an axis parallel to axis A shown in FIG. 4 extends through both of the first resistor 180a and the front portion 186). As described above and shown in FIG. 4, the refill 106 can be spaced apart from the rear face 130 by a distance D2. As shown in FIG. 17, the first resistor 180a is spaced apart from the rear face 130 (i.e., in a direction parallel to a direction defined between the front face 120 and the rear face 130) by a distance that is greater than D2 (e.g., the first resistor 180a is spaced farther from the rear face 130 than the refill 106 is spaced from the rear face). Additionally, the first resistor 180a is positioned closer to the rear face 130 than a distance between the lens 104 and the rear face 130. The first resistor 180a is thus be positioned in front of the of the refill 106 (i.e., closer to the front face 140 than the rear face 142), and the second resistor 180b is be positioned rearwardly of the refill 106 within the base 102.

Now referring to FIG. 18, a rear cross-sectional view is shown, which illustrates the circuit board 182, the plurality of LEDs 184, and the optical coupling portion of the lens 104. The second resistor 180 is also shown, which is disposed along the upper housing 202. The engagement of the lower housing 200 with the upper housing 202 is also shown in better detail. While additional features are not depicted within the housing, it is contemplated that one or more additional electronic components may be included within the housing, such as a receiver, a controller, a processor, another printed circuit board (PCB), one or more batteries, one or more microphones, one or more capacitors, resistors, transistors, logic circuits, or other electronic components.

Figure 19A:
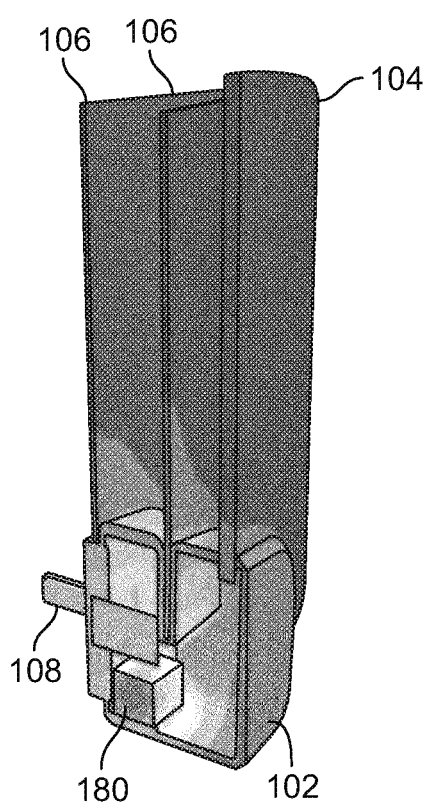
FIG. 19A is a heat map illustrating heat dissipation in the housing of an insect trap similar to the insect trap of FIG. 1 when a resistor is provided along a bottom wall thereof.
Figure 19B:
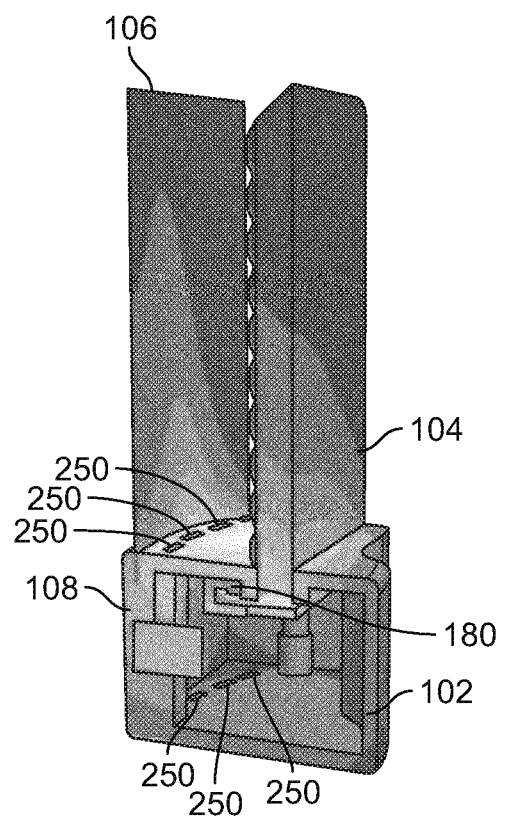
FIG. 19B is a heat map illustrating heat dissipation from another housing similar to the housing of the insect trap of FIG. 1 when a resistor is provided along an upper wall thereof.

Referring to FIGS. 19A and 19B, heat maps of alternative embodiments of the device 100 are shown that illustrate varying heat patterns depending on a location of the one or more resistors 180. One or more resistors, such as the resistor 180, may be disposed along varying locations within the base 102 to heat the base 102 near the refill 106, as an additional attractant for insects. Referring specifically to FIG. 19A, the resistor 180 is included along the lower housing 200 of the base 102. When coupled to the lower housing 200, the heat footprint emitted by the resistor 180 is shown to be most prominent along the lower housing 200. The lighter portions of the heat map depict warmer areas, which do not extend along a majority of the refill 106 or the lens 104. A second refill 106 is shown in the embodiment of FIG. 19A, which further illustrates that the heat does not extend farther along the second refill 106, which is disposed at a rear end of the base 102, than along the refill 106 that is located within the refill slot 156.

The heat maps provided in FIGS. 19A and 19B illustrate simulations that demonstrate how optimization of target temperature windows are achieved based on placement of one or more heat sources. Through testing and analyses, it has been determined that adjustment of the location and strength of the heat source changes a natural convection pattern, whereby the warmed air carries heat to the front surface 140 and the rear surface 142 of the refill 106. In alternative embodiments, the heat dispersion may be modified by adjusting the shape of the base 102, for example, by adding vents or adjusting the curvature along the faces 120, 122, 124, 126, 128, 130, which will impact a location of the natural convection plume of warm air rising from the base 120 of the device 100 to heat the refill surfaces 140, 142.

Referring now to FIG. 19B, the resistor 180 is provided along the upper housing 202 of the base 102. The refill 106 of FIG. 19B includes lighter, i.e., warmer portions that extend along substantially more of the refill 106 than the refill 106 of FIG. 19A. Further, FIG. 19B illustrates an alternative embodiment of the design, which includes vents 250 along the upper housing 202 and the lower housing 200, which allows heat to exit the base 102 through the vents 250 due to a chimney effect. The heat map signature of FIG. 19B was found to attract more insects to the device, and allows for optimized airflow via heat convection and conduction to attract insects. Further, during testing it was determined that locating the resistor 180 along a rear portion of the refill 106, toward the rotatable plug 108, allows the vicinity adjacent the wall 112 to heat up to attract more insects to this location, i.e., to the rear face 142 of the refill 106. Including the resistor 180 along varying portions of the base 102 may allow for varying efficacy or may be optimized based on the type of insect that is being attracted to the device 100.

The configuration shown in FIG. 19B achieves a heat plume that encompasses a greater volume of space surrounding the refill 106 than the configuration shown in FIG. 19A. In another simulation (not shown), the inclusion of two resistors 180 along the sides of the base 102 was found to achieve a heat plume that encompasses an even greater volume of space surrounding the refill 106 than the configuration shown in FIG. 19B. It has been determined that the key to optimizing the area in the target temperature range is to control the natural convection plume eminating from the base 102. For example a further optimization of 19B could involve adjusting the area of each of the vents such that the convection plume evenly heats the refill 102.

Referring now to the graph of FIG. 20, results from a number of efficacy tests for mosquito capture were conducted. The tests were controlled using mosquitos and were conducted using a testing device similar to the device 100. The individual tests differed with respect to characteristics of the refills that were utilized during the tests, such as color and pattern design. Otherwise, among the tested refills, the adhesive material used was the same. For each test, the testing device was plugged into an electrical socket within a chamber, and 30 mosquitos were released into the chamber. After two hours post insect introduction, the number of insects that had been caught by the test sample were counted. Further, the number of insects that had been caught by the test sample were also counted after six hours post insect introduction and after 24 hours post insect introduction.

As is evident from the results of the test, the Blue Granite and the Fly Box color/pattern design had a higher efficacy than the other materials. The Blue Luma refill was colored with Pantone® 310; the Blue Granite refill included dots colored with Pantone® 2142, 291, 298, and black; the Fly Box refill had a pattern with Pantone 2030 and Black; the Black refill was colored black; and the White refill was colored white. As illustrated in the graph of FIG. 20, the Blue Granite colored refill achieved a higher percentage catch at 2 hours and 6 hours, and the Fly Box patterns achieved a higher percentage catch at 24 hours. While the remaining colors (Blue Luma, Black, and White) achieved a lower percentage catch than the Blue Granite and the Fly Box refills, in many instances, the difference in efficacy is not statistically significant. The Blue Granite refill had the highest percentage catch at 2 hours (16%) and 6 hours (20%), while the Fly Box pattern had the highest percentage catch at 24 hours (35%). As such, the testing has revealed that the Blue Granite and the Fly Box sticky boards comprise preferred colors/patterns for use along the refill 106 of the present device 100 to provide for increased mosquito capture.

Now that the individual components and the assembly of the insect trap device 100 have been discussed, the relationship thereto and the operation of the insect trap device 100 will be discussed. Prior to use, the insect trap device 100 is preferably provided to a user in a sealed container (not shown), such as a bag, box, or other package. When a user desires to use the insect trap device 100, the user opens the container and removes the insect trap device 100 therefrom. In some embodiments, the user is required to attach the lens 104 to the base 102; however, it is also contemplated that the lens 104 comes preassembled to the base 102.

Next, the user removes any packaging from around the refill 106. Thereafter, the user removes the peel-off cover 232 from the refill 106 by grabbing a peel-off starting portion, if one is provided. The refill 106 is now in an operational state and ready for insertion into the insect trap device 100. A user may now slidingly insert the refill 106 into the refill slot 156 in the base 102. The insect trap device 100 may now be characterized as being in an operable state. In such an operable state, the user can now plug the rotatable plug 108 into the wall socket 110. A switch (not shown) may be provided along the base 102, which allows a user to manipulate the power provided to the device 100. In some embodiments, there is no switch, and the device 100 has a single operational state, "on", which is effected once the device is plugged in. Once the device 100 has been turned on, the LEDs 184 are illuminated, light refracts through the lens 104, and shines along the wall 112 adjacent the wall socket 110.

Once the device 100 has been turned on, the insect trap device 100 is capable of operating on its own and drawing insects toward the device 100 for entrapment along the refill 106. In a preferred embodiment, the refill 106 retains sufficient stickiness to entrap insects for about six months, or about 180 days. In some embodiments, the refill 106 has sufficient stickiness to entrap insects for between about 40 days and about 280 days, or between about 80 days and about 240 days, or between about 120 days and about 200 days. In some embodiments, the refill 106 can be used for between about 3 days and about 60 days, or between about 7 days and about 30 days, or between about 10 days and about 20 days, or about 14 days.

Any of the embodiments described herein may be modified to include any of the structures or methodologies disclosed in connection with different embodiments. Further, the present disclosure is not limited to substrate and/or support component shapes/sizes of the type specifically shown. Still further, the support components of any of the embodiments disclosed herein may be modified to work with various types of substrates consistent with the disclosure herein.

INDUSTRIAL APPLICABILITY

Numerous modifications to the present disclosure will be apparent to those skilled in the art in view of the foregoing description. Accordingly, this description is to be construed as illustrative only and is presented for the purpose of enabling those skilled in the art to make and use the device disclosed herein. The exclusive rights to all modifications which come within the scope of the appended claims are reserved.

We claim:

1. An insect attractant device, comprising:
a housing defining a top face;
an electronics assembly comprising a first resistor and a first LED;
a lens disposed along the housing; and
a substrate disposed along the housing, the substrate including first and second lateral portions that are configured to straddle the housing,
wherein the substrate is spaced apart from the lens defining a first distance therebetween,
wherein the first distance is between about 15 mm and about 30 mm, and
wherein the top face includes a front portion positioned between the lens and the substrate, the first resistor being positioned vertically below the front portion.

2. The insect attractant device of claim 1, wherein the housing defines a rear face, and wherein the substrate is spaced apart from the rear face defining a second distance therebetween, wherein the second distance is between about 10 mm and 20 mm.

3. The insect attractant device of claim 1, wherein the housing defines a planar slot, and wherein the substrate is received into the planar slot.

4. The insect attractant device of claim 3, wherein the planar slot includes chamfered slot edges, the chamfered slot edges being configured to assist in guiding placement of the substrate along the housing.

5. The insect attractant device of claim 1, wherein the substrate comprises a form that is substantially planar, and wherein a rigidity of the substrate is sufficient to maintain the form of the substrate.

6. The insect attractant device of claim 1, wherein the first LED is one of a plurality of LEDs.

7. The insect attractant device of claim 1, wherein the substrate includes an adhesive applied to at least a first face.

8. An insect attractant device, comprising:
a housing defining a rear face;
an electronics assembly comprising a first resistor and a plurality of LEDs;

a lens disposed along the housing; and a substrate disposed between the lens and the rear face, the substrate including first and second lateral portions that are configured to straddle the housing, wherein the substrate is spaced apart from the rear face defining a first distance therebetween, wherein the first distance is between about 10 mm and about 20 mm, and wherein the first resistor is spaced apart from the rear face by a greater distance than the first distance.

9. The insect attractant device of claim 8, further including a power source, the power source extending from the rear face of the housing.

10. The insect attractant device of claim 8, wherein the substrate is spaced apart from the lens defining a second distance therebetween, wherein the second distance is between about 15 mm and about 30 mm.

11. The insect attractant device of claim 8, wherein the substrate is substantially planar.

12. The insect attractant device of claim 8, wherein the substrate includes an adhesive applied to a first face and a second face, the adhesive being surrounded by an adhesive-free border on the first face and the second face.

13. The insect attractant device of claim 8, wherein the lens includes a chamfered edge that directs light in a direction of the substrate.

14. An insect attractant device, comprising:

a housing defining a rear face;

an electronics assembly comprising a first resistor and a first LED;

a lens disposed along the housing; and a substrate disposed between the lens and the rear face, the substrate including first and second lateral portions that are configured to straddle the housing, wherein the substrate is spaced apart from the lens defining a first distance therebetween, wherein the substrate is spaced apart from the rear face defining a second distance therebetween, wherein the first distance is between about 5 mm and about 50 mm and the second distance is between about 5 mm and about 50 mm.

15. The insect attractant device of claim 14, further comprising a power source, the power source positioned at the rear face of the housing.

16. The insect attractant device of claim 14, wherein the substrate is substantially planar.

17. The insect attractant device of claim 14, wherein the first LED is one of a plurality of LEDs.

18. The insect attractant device of claim 17, wherein the plurality of LEDs are ultraviolet LEDs.

19. The insect attractant device of claim 14, wherein the substrate includes an adhesive applied to at least a first face.

20. The insect attractant device of claim 14, wherein the substrate is removably attached to the housing.

21. The insect attractant device of claim 14, wherein the first distance is between about 10 mm and about 50 mm.

22. The insect attractant device of claim 14, wherein the second distance is between about 10 mm and about 50 mm.

23. The insect attractant device of claim 14, wherein the first distance is larger than the second distance.

24. The insect trap of claim 15, wherein the power source comprises a pair of electrical prongs extending outwardly from the rear face.

25. The insect trap of claim 14, further comprising a battery within the housing.

26. The insect trap of claim 14, wherein the housing defines at least one stabilizing feature configured to allow the insect trap to rest on a flat surface in an upright configuration.

27. The insect trap of claim 26, wherein the at least one stabilizing feature includes one or more stabilizing feet.

* * * * *